United States Patent
Higa

(10) Patent No.: US 12,174,918 B2
(45) Date of Patent: Dec. 24, 2024

(54) INFORMATION PROCESSING APPARATUS AND SYSTEM, AND MODEL ADAPTATION METHOD AND NON-TRANSITORY COMPUTER READABLE MEDIUM STORING PROGRAM

(71) Applicant: NEC Corporation, Tokyo (JP)

(72) Inventor: Ryota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 923 days.

(21) Appl. No.: 17/278,701

(22) PCT Filed: Sep. 27, 2018

(86) PCT No.: PCT/JP2018/035858
§ 371 (c)(1),
(2) Date: Mar. 23, 2021

(87) PCT Pub. No.: WO2020/065808
PCT Pub. Date: Apr. 2, 2020

(65) Prior Publication Data
US 2022/0036122 A1    Feb. 3, 2022

(51) Int. Cl.
*G06N 3/04* (2023.01)
*G06F 18/21* (2023.01)
*G06F 18/2321* (2023.01)
*G06F 18/24* (2023.01)
*G06N 3/047* (2023.01)

(52) U.S. Cl.
CPC ...... *G06F 18/2321* (2023.01); *G06F 18/2178* (2023.01); *G06F 18/24765* (2023.01); *G06N 3/047* (2023.01)

(58) Field of Classification Search
CPC ........ G06N 3/047; G06N 3/0475; G06N 3/04; G06N 3/02; G06N 3/042
See application file for complete search history.

(56) References Cited

U.S. PATENT DOCUMENTS 11,308,401 B2 *  4/2022  Taylor ................... G06N 3/006
11,501,042 B2 * 11/2022  Steingrimsson ......... G06N 3/04
2018/0181089 A1   6/2018  Fuji et al.
(Continued)

FOREIGN PATENT DOCUMENTS

JP    H07-325604 A   12/1995
JP    2018-106466 A   7/2018

OTHER PUBLICATIONS

Kono et al., "Hierarchical Transfer Learning Using Heterogeneous Multiple Autonomous Agents", 2015, Special Feature 19th Robotics Symposia II, Proceedings of the Society of Instruments and Control Engineers, vol. 15, No. 6, pp. 409-420 (Year: 2015).*
(Continued)

*Primary Examiner* — Paulinho E Smith

(57) ABSTRACT

A model adapted to a predetermined system is adapted to another system with an environment or an agent similar to that of the predetermined system. Specifically, a first model adapted to a first system that is operated based on a first condition including a specific environment and a specific agent is corrected using a correction model to generate a second model. The second model is adapted to a second system that is operated based on a second condition, where the second condition is partially different from the first condition.

11 Claims, 17 Drawing Sheets

(56) References Cited

U.S. PATENT DOCUMENTS

2023/0099087 A1\* 3/2023 Kim .................... G06N 7/01
706/25
2023/0368026 A1\* 11/2023 Cox ..................... G06N 3/006

OTHER PUBLICATIONS

International Search Report for PCT Application No. PCT/JP2018/035858, mailed on Jan. 8, 2019.

Shoichiro Yamaguchi et al., "Identification of animal behavioral strategies by inverse reinforcement learning", PLOS Computational Biology, May 2, 2018, pp. 1-20.

Hitoshi Kono et al., "Hierarchical Transfer Learning in Heterogeneous Multi-agent Systems", Transactions of the Society of Instrument and Control Engineers, 2015, vol. 51, No. 6, pp. 409-420, ISSN 0453-4654.

Matthew E. Taylor et al., "Transfer Learning via Inter-Task Mappings for Temporal Difference Learning", Journal of Machine Learning Research 2007, vol. 8, pp. 2125-2167, Internet: <URL: http://www.jmlr.org/papers/volume8/taylor07a/taylor07a.pdf>.

\* cited by examiner

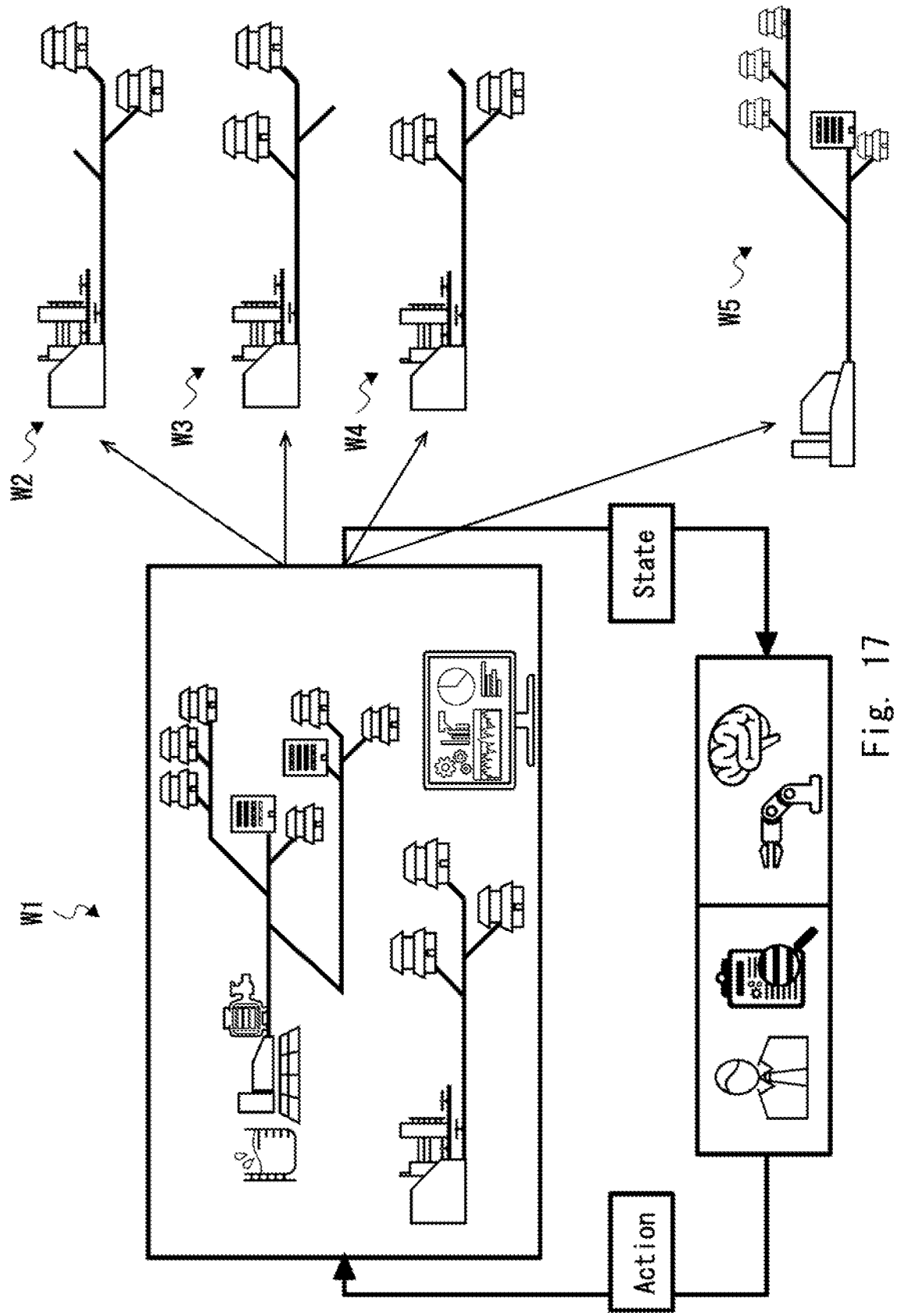

INFORMATION PROCESSING APPARATUS AND SYSTEM, AND MODEL ADAPTATION METHOD AND NON-TRANSITORY COMPUTER READABLE MEDIUM STORING PROGRAM

This application is a National Stage Entry of PCT/JP2018/035858 filed on Sep. 27, 2018, the contents of all of which are incorporated herein by reference, in their entirety.

TECHNICAL FIELD

The present disclosure relates to information processing apparatus and system, and a non-transitory computer readable medium in which model adaptation method and program are stored.

BACKGROUND ART

In the field of AI (Artificial Intelligence), various algorithms for machine learning have been proposed. As an example, Patent Literature 1 discloses a technique for mechanically realizing method and means of intelligent work which is considered to be performed when a human controls a control system.

Non Patent Literature 1 discloses a technique related to inverse reinforcement learning using simulation.

CITATION LIST

Patent Literature

Patent Literature 1: Japanese Unexamined Patent Application Publication No. H07-325604

Non Patent Literature

Non Patent Literature 1: Shoichiro Yamaguchi, Honda Naoki, Muneki Ikeda, Yuki Tsukada, Shunji Nakano, Ikue Mori, Shin Ishii, Identification of animal behavioral strategies by inverse reinforcement learning, PLOS Computational Biology, May 2, 2018.

SUMMARY OF INVENTION

Technical Problem

By using the techniques described in Patent Literature 1 and Non Patent Literature 1, a first model adapted to a first system can be obtained from expert data accumulated in the first system operated in a specific environment by a specific agent. However, a second system having a similar environment or a similar agent but different from the first system cannot be operated using the first model obtained as above without correcting the first model. If the first model is used without a correction in the second system, there is a possibility that an unintended output is returned.

Further, in order to newly obtain a second model adapted to the second system, additional learning is required using expert data in the second system, which is costly. Therefore, there is a problem that a model adapted to a predetermined system is not sufficiently utilized according to changes in the environment or the agent.

The present disclosure has been made to solve such a problem. An object of the present disclosure is to provide an information processing apparatus for utilizing a model adapted to a predetermined system and efficiently adapting the model to another system with an environment or an agent similar to those of the predetermined system.

Solution to Problem

A first example aspect of the present disclosure is an information processing apparatus including:
a generation unit configured to correct a first model adapted to a first system operated based on a first condition including a specific environment and a specific agent using a correction model to thereby generate a second model; and
an adaptation unit configured to adapt the second model to a second system operated based on a second condition, the second condition being partially different from the first condition.

A second example aspect of the present disclosure is an information processing system including:
a storage unit configured to store a first model adapted to a first system operated based on a first condition including a specific environment and a specific agent and a predetermined correction model;
a generation unit configured to generate a second model by correcting the first model using the correction model; and
an adaptation unit configured to adapt the second model to a second system operated based on a second condition, the second condition being partially different from the first condition.

A third example aspect of the present disclosure is a model adaptation method performed by a computer including:
correcting a first model adapted to a first system operated based on a first condition including a specific environment and a specific agent using a correction model to thereby generate a second model; and
adapting the second model to a second system operated based on a second condition, the second condition being partially different from the first condition.

A fourth example aspect of the present disclosure is a non-transitory computer readable medium storing a model adaptation program for causing a computer to execute:
a process of correcting a first model adapted to a first system operated based on a first condition including a specific environment and a specific agent using a correction model to thereby generate a second model; and
a process of adapting the second model to a second system operated based on a second condition, the second condition being partially different from the first condition.

Advantageous Effects of Invention

According to the above example aspects, it is possible to provide an information processing apparatus for utilizing a model adapted to a predetermined system and efficiently adapting the model to another system with an environment or an agent similar to those of the predetermined system.

BRIEF DESCRIPTION OF DRAWINGS

FIG. 17 is a diagram for explaining a concept of applying a water supply model of a water supply infrastructure in an area to another waterworks bureau according to a seventh example embodiment.

DESCRIPTION OF EMBODIMENTS

Figure 1:
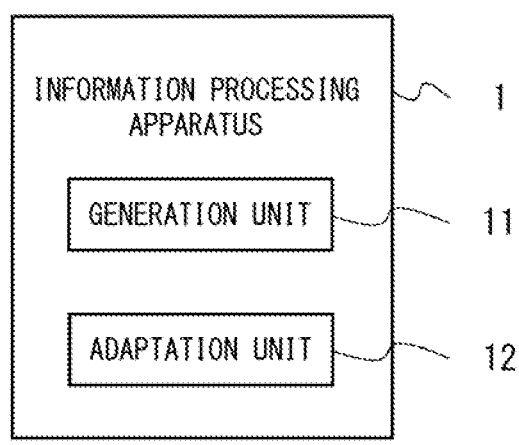
FIG. 1 is a block diagram showing a configuration of an information processing apparatus according to a first example embodiment.

Hereinafter, example embodiments of the present disclosure will be described in detail with reference to the drawings. In the drawings, the same or corresponding elements are denoted by the same reference signs, and repeated descriptions are omitted as necessary for clarity of description.

Reinforcement Learning is known as a kind of machine learning. The reinforcement learning is a method to learn appropriate actions according to the state of the environment for an "agent" (a person or a computer) which takes an "action" in an "environment" in which a "state" can change. Here, a function for outputting the action according to the state of the environment is referred to as a "policy (strategy) function". The policy function outputs an appropriate action according to the state of the environment by performing reinforcement learning.

Further, in the reinforcement learning, it is assumed that a "reward function" for outputting a "reward" given to the action of the agent or the state of the environment transitioned by the action of the agent is given. The reward is a reference (evaluation criterion) for evaluating the action of the agent, and an evaluation value is determined based on the reward. For example, the evaluation value is a sum of the rewards that the agent receives while taking a series of actions. The evaluation value is an index for determining a purpose of the action of the agent. For example, the learning of the policy function is performed so as to achieve the purpose of "maximizing the evaluation value". Since the evaluation value is determined based on the reward, it can be said that the learning of the policy function is performed based on the reward function.

It is sometimes difficult to design reward functions when you work on real-world problems. In this case, imitation learning may be used. In the imitation learning, the strategy (policy) function for imitating the action of an expert is derived by learning a model using accumulated expert data, which is data of the actions and so on according to the state by the expert who is a skilled agent. Thus, Inverse Reinforcement Learning is attracting attention as a kind of imitation learning.

First Example Embodiment

FIG. 1 is a block diagram showing a configuration of an information processing apparatus 1 according to a first example embodiment. The information processing apparatus 1 is a computer for generating a model for outputting the action to be taken by the agent who is a user of a system from a condition such as an environment of a predetermined system and for learning (adapting) parameters of the model. Such a computer may also be referred to as a learning apparatus. Note that the information processing apparatus 1 may be composed of two or more computers. The information processing apparatus 1 includes a generation unit 11 and an adaptation unit 12.

The generation unit 11 generates a second model by correcting a first model adapted to a first system using a correction model. The "first system" here is an information system or a control system operated based on a first condition including a specific environment and a specific agent. Alternatively, the "first system" may be a social system including such information or control system. Here, the "environment" can take a plurality of "states" according to an input action, and can be referred to as a system in a narrow sense. The "state" can be represented by a state vector. The "agent" is a person who can take a plurality of "actions" in the environment and is a human (an operator) who is a user of the system or a computer (that is operated by an agent program). The state of the environment transitions according to the action of the agent. The agent decides the next action according to the current state of the environment. The term "operation" also includes operating and executing the system in the specific environment by the specific agent.

The "first model" is a model expression such as a function defined by a parameter and a variable, and outputs a value obtained in response to an input. In particular, the first model is the model in which the parameter is adapted (optimized) under the first condition including an environment and an agent of the first system. The first model may be created from empirical rules by an operator, an administrator, or the like, or may be learned by imitation using an expert data set which is a history of the actions and states of a skilled agent. The first model may be, for example, a model for outputting the action of a store manager according to the state of a convenience store. Alternatively, the first model may be a model for outputting a driving operation (accelerator, brake, steering wheel operation, etc.) to be performed by a driver according to a road shape on an expressway, a positional relationship with the surrounding vehicles, and the vehicle speed.

The term "adapt" refers to optimizing parameter values in a model for the condition of a target system. In other words, the term "adapt" refers to adjusting the parameter of the model to optimize the parameter. Therefore, the "first model" includes the parameter value optimized for the condition including the environment and agent of the first system.

The "correction model" is a model expression for adding a correction to a model, a correction parameter, etc. The correction model may be preset or calculated based on a second condition.

The adaptation unit 12 adapts the second model generated by the generation unit 11 to a second system. The "second system" here is a system operated based on the second condition which is partially different from the first condition. The second condition is a condition in which at least one of a specific environment or a specific agent included in the second condition is different from that included in the first condition. That is, it is assumed that the first system and the second system are not systems having different purposes but systems having a common or similar purpose. In other words, the first condition and the second condition have a common part in their condition.

Likewise, the term "adapt the second model to the second system" means optimizing the parameter values included in the second model in accordance with the second condition (the environment and the agent) of the second system.

Figure 2:
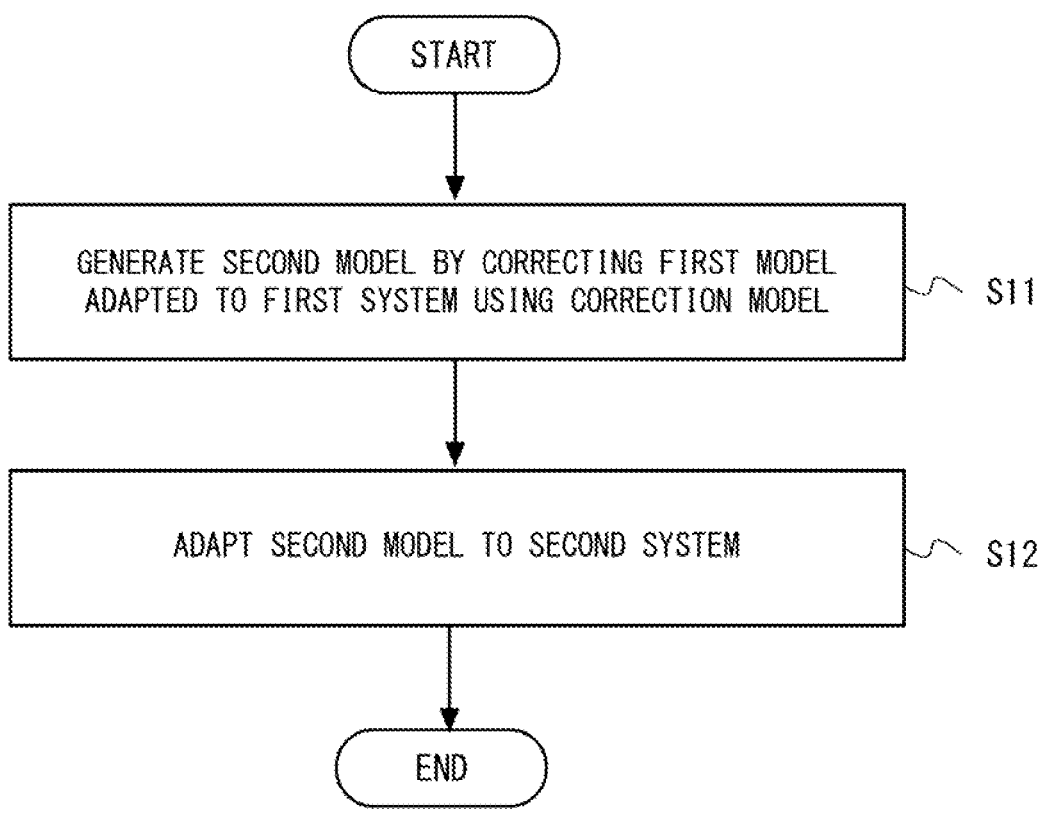
FIG. 2 is a flowchart showing a flow of a model adaptation method according to the first example embodiment.

FIG. 2 is a flowchart showing a flow of a model adaptation method according to the first example embodiment. First, the generation unit 11 generates the second model by correcting the first model adapted to the first system using the correction model (S11). Next, the adaptation unit 12 adapts the second model to the second system (S12). Thus, a model adapted to a predetermined system can be utilized to efficiently adapt to other systems with similar environment or agent.

Here, although the first system and the second system are common in that they are intended for a specific application, they are different in specific application environments (time, place, etc.) or agents (personnels, etc.). Therefore, if the first model is used as it is in the second system for operation, there is a possibility that the first model may return an unintended output. For this reason, the first model cannot be used as it is in the second system. However, it is costly to obtain the second model adapted to the second system in the same manner as the first model. For example, properly defining the second model requires advanced knowledge and is difficult. Further, in order to adjust the parameter of the second model with high accuracy by the imitation learning, a large amount high-quality expert data in the second system is required. However, it takes a long time to accumulate a large amount of high-quality expert data. In particular, when the second system is not yet in operation, it is difficult to acquire the expert data itself.

Therefore, in this example embodiment, it is assumed that there is the first model that has been adapted in some way to the first system which is similar to the second system. The first model is corrected using the correction model. The second model, which is the corrected model, is used to adapt to the second condition of the second system. By operating the second system using the second model thus adapted, the second model can return an output in accordance with an original intention. The reason for this is that the second model is a modification of a part of the first model adapted to the first system which is similar to the second system. The modified second model is adapted to the second system. For this reason, the modified second model is less likely to return an unintended output. Further, the cost required for generating the second model and the cost required for adaptation can be greatly reduced. The reason for this is that the second model is not designed from scratch, and only a part of the second model is corrected based on the first model. In addition, since the output when the second system is operated using the second model is close to the original intention, it is possible to perform highly accurate adaptation with a small amount of data by learning using operation data acquired through the operation.

The information processing apparatus 1 includes a processor, a memory, and a storage device (not shown). Further, the storage device stores a computer program in which processing of the model adaptation method according to this example embodiment is implemented. The processor reads the computer program from the storage device into the memory and executes the computer program. By doing so, the processor realizes the functions of the generation unit 11 and the adaptation unit 12.

Alternatively, each of the generation unit 11 and the adaptation unit 12 may be realized by dedicated hardware. Further, some or all of the constituent elements of each device may be implemented by general-purpose or dedicated circuitry, processors, etc., or a combination thereof. These constituent elements may be composed of a single chip or a plurality of chips connected via a bus. Some or all of the constituent elements of each device may be implemented by a combination of the circuitry, the program, and the like described above. The processor may be a CPU (Central Processing Unit), a GPU (Graphics Processing Unit), an FPGA (field-programmable gate array), or the like.

Further, when some or all of the constituent elements of the information processing apparatus 1 are realized by a plurality of information processing apparatuses, circuitry, etc., the plurality of information processing apparatuses, circuitry, and the like, may be collectively arranged or arranged separate from each other. For example, the information processing apparatus, the circuitry, and the like may be implemented as a form where they are connected to each other via a communication network, such as a client server system, a cloud computing system, and the like. Further, the function of the information processing apparatus 1 may be provided in a SaaS (Software as a Service) format.

The information processing apparatus 1 acquires the first model from the outside in advance and stores it in an internal storage device or a memory. The processor performs correction or the like on the first model stored in the storage device or the memory. The processor may also store the adapted second model in the internal storage device or output it to an external system or storage device.

Second Example Embodiment

A second example embodiment is a specific example of the first example embodiment. An information processing system according to the second example embodiment includes a sequential reward learning unit, a model correction unit, an adaptation unit, and a storage unit. However, the sequential reward learning unit and the adaptation unit may be a single unit. The storage unit may store at least the first model and the correction model described above. The model correction unit and the adaptation unit may have at least the functions similar to those of the generation unit 11 and the adaptation unit 12 described above.

Figure 3:
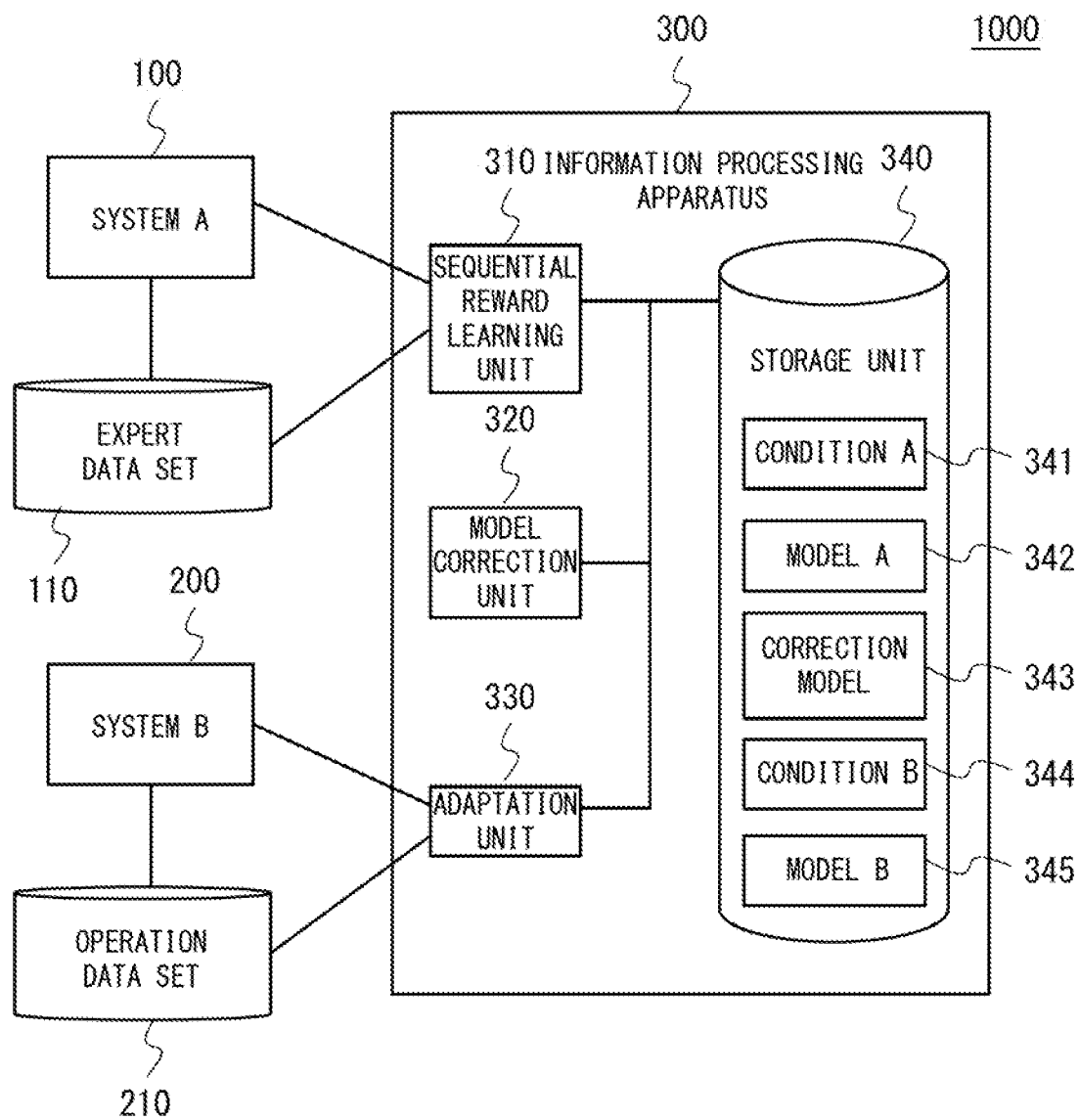
FIG. 3 is a block diagram showing an overall configuration of an information processing system according to a second example embodiment.

FIG. 3 is a block diagram showing an overall configuration of an information processing system 1000 according to the second example embodiment. The information processing system 1000 includes a system A100, an expert data set 110, a system B200, an operation data set 210, and an information processing apparatus 300. The system A100 is an example of the first system.

Figure 4:
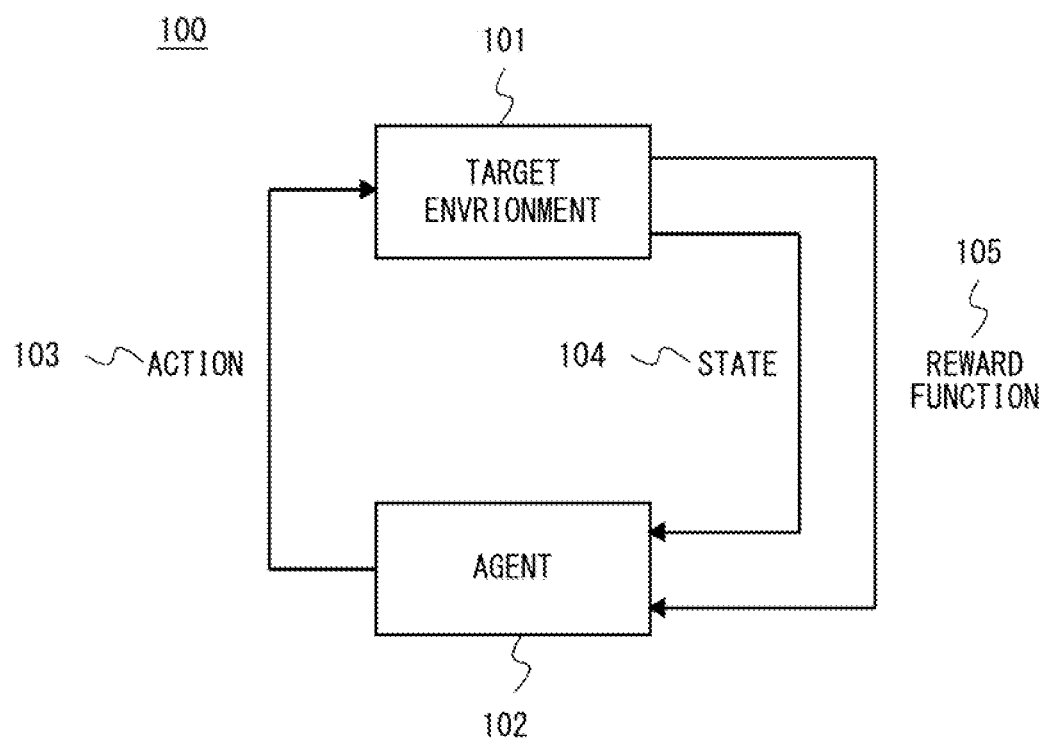
FIG. 4 is a diagram for explaining a concept of a system according to the second example embodiment.

FIG. 4 is a diagram for explaining a concept of the system A100 according to the second example embodiment. The system A100 includes a target environment 101 and an agent 102. The target environment 101 corresponds to the above-described "environment" and can have a plurality of states. The agent 102 corresponds to the "agent" described above, and is a person (or a computer) who can take a plurality of actions in the environment.

For example, when the system A100 is an automatic driving system, the agent 102 is an automatic driving vehicle, and a state 104 of the target environment 101 is a set of a driving state and a surrounding state (a map of the surroundings, locations and speeds of other vehicles, road conditions, etc.) of the automatic driving vehicle. Thus, the state 104 is represented by a state vector S=(s1, s2, ... ). When the agent 102 takes a certain action 103 (an operation of the accelerator, brake, or steering wheel), the target environment 101 transitions to the state 104 (speeding up and down, lane change, etc.) according to the action 103. When sequential reward learning described later is performed on the system A100, a reward function 105 is used. That is, the target environment 101 inputs the action 103 to the reward function 105 and outputs a reward to the agent 102.

Here, the action 103 to be taken by the agent 102 differs according to the state 104 of the target environment 101. In the example of the automatic driving system described above, the vehicle may continue to proceed if there is no obstacle ahead of the vehicle, but if there is an obstacle ahead of the vehicle, the agent 102 needs to take the action 103 to proceed so as to avoid the obstacle. In addition, the agent 102 needs to take the action 103 to change the traveling speed of the vehicle according to the condition of the road surface ahead and the distance between the vehicle and the vehicle ahead.

Referring back to FIG. 3, the description will be continued. The expert data set 110 is action data such as a combination of the action 103 of the skilled agent 102 in the system A100 and the state 104 at that time. That is, the expert data set 110 is an operation data set when it is operated in the system A100. However, when the system A100 is a simulator, the expert data set 110 also includes data of simulation results. It is assumed that the expert data set 110 is stored in a storage device or the like.

A system B200 is an example of the second system. That is, the system B200 is similar to the system A100. For example, the system B200 is a real environment when the system A100 is used as a simulator, a system after upgrade of or migration to the system A100, or a derived model when the system A100 is used as a base model. Since the concept of the system B200 is the same as that of the system A100, the illustration and detailed description of the system B200 are omitted.

The operation data set 210 is a set of data when the system B200 is operated. However, the data amount of the operation data set 210 may be smaller than that of the expert data set 110.

The information processing apparatus 300 is an example of the information processing apparatus 1. The information processing apparatus 300 includes a sequential reward learning unit 310, a model correction unit 320, an adaptation unit 330, and a storage unit 340. The storage unit 340 is a storage device or memory such as a hard disk or a flash memory. The storage unit 340 stores a condition A341, a model A342, a correction model 343, a condition B344, and a model B345.

The condition A341 is an example of the information indicating the above-mentioned first condition, and is information indicating a set of the target environment 101 and the agent 102 when the system A100 is operated. The condition B344 is an example of the information indicating the above-mentioned second condition, and is information indicating a set of the target environment 101 and the agent 102 when the system B200 is operated. That is, at least a part of the target environment 101 and the agent 102 of the condition A341 is different from that of the condition B344.

The model A342 is an example of the above-described first model, and is an information group showing a model expression including parameter values adapted to the system A100. The model A342 may be, for example, a set of a program file in which the model expression is implemented and a configuration file including optimized parameter values. The model expression may be expressed using the respective vectors of the state 104 and the action 103 described above and a set of parameter variables. The model A342 may include a policy function, a reward function, a physical equation, a state transition probability, and the like, as described later. The reward function and the physical equation may be collectively referred to as an evaluation criterion. The model B345 is an example of the above-described second model, and is an information group showing a model expression including parameter values before or after being adapted to the system B200.

The correction model 343 is an example of the above-mentioned correction model, and in this example embodiment, the correction model 343 is a parameter function using a state s and an action a. However, the correction model 343 is not limited to this.

The sequential reward learning unit 310 uses the expert data set 110 to perform the sequential reward learning of the model A100 in the system A342. That is, the sequential reward learning unit 310 uses the expert data set 110 as learning data to adjust the parameters of the model A342 to optimum values. Further, the sequential reward learning unit 310 stores in the storage unit 340 or updates the learned model A342 in which the adjusted parameter values are set.

Here, the details of the processing of the sequential reward learning will be supplemented. First, the sequential reward learning unit 310 generates the policy function by the sequential reward learning. Here, the "sequential reward learning" is a method including not only the imitation learning and inverse reinforcement learning but also design of the reward function based on imitation and processing for updating the designed reward function. The imitation learning is a process of learning the strategy function by imitating the action of the expert (a skilled person). The inverse reinforcement learning is a process of learning the reward function that can reproduce the action of the expert. In contrast, the sequential reward learning aims at learning more than the expert. The "policy function" is a function for outputting the action 103 to be taken by the agent 102 according to the state 104 of the target environment 101, and is also referred to as the "strategy function". When the policy function is learned to be ideal, the policy function outputs an optimum action that should be taken by the agent according to the state of the target environment.

The sequential reward learning is performed using data in which the state vector s is associated with the action a (such data is hereinafter referred to as the action data). In this example embodiment, the expert data set 110 is used as the action data. The policy function obtained by the sequential reward learning imitates the given action data. Existing algorithms may be used for the sequential reward learning.

Further, the sequential reward learning unit 310 according to this example embodiment learns the reward function through the sequential reward learning of the policy function. In order to do so, a policy function P is defined as a function that receives as an input a reward r(s) obtained by inputting the state vector s to the reward function r. The policy function P outputs the action a. Therefore, the policy function P can be defined as a=P(r(s)).

Further, the strategy (policy), which is a rule for the agent to select the action a, is represented by $\pi$, and a probability of selecting the action a in the state s under the strategy $\pi$ is represented by $\pi(s, a)$. In this case, the action a obtained from the strategy $\pi$ is defined by the following Formula 1.

$$a \sim \pi(a|r(s)) \qquad \text{(Formula 1)}$$

That is, the sequential reward learning unit 310 according to this example embodiment formulates the policy function as a functional of the reward function. By performing the sequential reward learning after defining the policy function thus formulated, the sequential reward learning unit 310 generates the policy function and the reward function by learning the reward function while learning the policy function.

The probability of selecting a state s' from the state s and the action a can be expressed as $\pi(a|s)$. When the strategy is defined as in Formula 1 shown above, the relation of Formula 2 shown below can be defined using the reward function r(s, a). Note that the reward function r(s, a) is sometimes referred to as $r_a(s)$.

$$\pi(a|s) := m(a|r(s,a)) \qquad \text{(Formula 2)}$$

The sequential reward learning unit 310 may learn the reward function r(s, a) using a function formulated as shown in the following Formula 3. In Formula 3, $\lambda'$ and $\theta'$ are parameters determined by data, and $g'(\theta')$ is a regularization term.

[Equation 1]

$$r(s, a) := \sum_{i}^{N} \theta'_i s_i + \sum_{j=N+1} \theta'_j a_j + \lambda' g'(\theta') \qquad \text{(Formula 3)}$$

Since the probability $\pi(a|s)$ for selecting the strategy is related to the reward obtained by the action a in the certain state s, the probability $\pi(a|s)$ can be defined using the reward function $r_a(s)$ described above in the form of the following Formula 4. Note that $Z_R$ is a partition function, and $Z_R = \Sigma_a \exp(r_a(s))$.

[Equation 2]

$$\pi(a|s) := \frac{\exp(r_a(S))}{Z_R} \qquad \text{(Formula 4)}$$

Here, as shown in Formula 4 above, it can be said that the strategy $\pi$ representing the action a to be taken in the certain state s has a relationship with the state s of the certain environment and the reward function r(s, a) for determining the reward r obtained by the action a selected in that state. The reinforcement learning aims to find an appropriate strategy $\pi$ by learning in consideration of this relationship.

On the other hand, the inventor of the present disclosure has conceived that an idea of finding the strategy $\pi$ based on the state s and the action a in the reinforcement learning can be used to find a mechanism of a non-obvious system based on a certain phenomenon. Note that the system here is not limited to a mechanically constructed system, but also includes any system existing in nature.

An example of a probability distribution for a certain state is the Boltzmann distribution (Gibbs distribution) in statistical mechanics. In terms of statistical mechanics, when an experiment is conducted based on certain experimental data, some energy state is generated based on a predetermined mechanism, and this energy state is considered to correspond to the reward in the reinforcement learning.

In other words, it can be said that in the reinforcement learning, the energy distribution can be estimated due to the determination of a certain equation of motion in statistical mechanics so that the strategy can be estimated due to the determination of a certain reward. Thus, one of the reasons the state and action are associated with each other is that the state and action are connected by the concept of entropy.

In general, the energy state can be represented by a "physical equation" (e.g., the Hamiltonian) representing a physical quantity corresponding to the energy. Therefore, the sequential reward learning unit 310 provides a problem setting about a function to be estimated in the reinforcement learning so that the Boltzmann distribution in statistical mechanics can be estimated in the framework of reinforcement learning.

Specifically, the sequential reward learning unit 310 associates the strategy $\pi(a|s)$ for determining the action a to be taken in the state s of the environment with the Boltzmann distribution representing a probability distribution of a predetermined state, as the problem setting covered by the reinforcement learning. Further, the sequential reward learning unit 310 associates the reward function r(s, a) for determining the state s of the environment and the reward r obtained by the action selected in that state with a physical equation (the Hamiltonian) representing a physical quantity corresponding to the energy, as the problem setting covered by the reinforcement learning. In this way, the sequential reward learning unit 310 models the problem covered by the reinforcement learning.

Here, when the Hamiltonian is H, the generalized coordinate is q, and the generalized momentum is p, a Boltzmann distribution f(q, p) can be expressed by the following Formula 5. In Formula 5, $\beta$ is a parameter representing the temperature of the system, and $Z_S$ is a partition function.

[Equation 3]

$$f(q, p) = \frac{\exp(-\beta H(q, p))}{Z_S} \qquad \text{(Formula 5)}$$

In comparison with Formula 4, it can be said that the Boltzmann distribution in Formula 5 corresponds to the strategy in Formula 4, and that the Hamiltonian in Formula 5 corresponds to the reward function in Formula 4. In other words, it can be said that the Boltzmann distribution in statistical mechanics can be modeled in the framework of the reinforcement learning also from the correspondence relationship between Formulas 4 and 5.

Hereinafter, a specific example of the physical equation associated with the reward function r(s, a) (Hamiltonian, Lagrangian, etc.) will be described. The following Formula 6 holds for a "state transition probability" p based on the physical equation h(s, a).

$$p(s'|s,a)=p(s'|h(s,a)) \quad \text{(Formula 6)}$$

The right side of Formula 6 can be defined as Formula 7 shown below. In Formula 7, $Z_S$ is a partition function, and $Z_S = \Sigma_{S'} \exp(h_{s'}(s,a))$.

[Equation 4]

$$p(s' \mid h(s, a)) := \frac{\exp(h'_s(s, a))}{Z_S} \quad \text{(Formula 7)}$$

If a condition that satisfies the laws of physics such as time inversion, space inversion, and quadratic form, is given to h(s, a), the physical equation h(s, a) can be defined as shown in Formula 8 below. In Formula 8, λ and θ are parameters determined by data, and g(θ) is a regularization term.

[Equation 5]

$$h(s, a) = \sum_{i,j}^{N} \theta_i s_i s_j + \sum_{k=2N+1} \theta_k a_k + \lambda g(\theta) \quad \text{(Formula 8)}$$

Energy states may not be accompanied by an action in some cases. As shown in Formula 8, the sequential reward learning unit 310 can express the state not accompanied by an action by setting the equation of motion separately for the effect caused by the action a and the effect caused by the state s independently of the action.

Further, in comparison with Formula 3 shown above, each term of the equation of motion in Formula 8 can be associated with each term of the reward function in Formula 3. Therefore, it is possible to estimate the physical equation using the method of learning the reward function in the framework of the reinforcement function. By performing the above-described processing, the sequential reward learning unit 310 can design a model (specifically, the cost function) necessary for the learning.

Based on the set model, the sequential reward learning unit 310 performs the reinforcement learning using learning data (the expert data set 110, etc.) including the state s to estimate the parameters of the physical equation. As described above, there are cases where the energy state does not need to be accompanied by an action, and thus the sequential reward learning unit 310 performs the reinforcement learning using the learning data including at least the state s. Further, the sequential reward learning unit 310 may estimate the parameters of the physical equation by performing the reinforcement learning using the learning data including the state s and the action a.

For example, if the state of the system observed at a time t is $s_t$ and the action is $a_t$, these pieces of data can be expressed as a time-series operation data set $D_t=\{s_t, a_t\}$ representing the action and effect on the system. Further, since information simulating the behavior of a physical phenomenon is obtained by estimating the parameters of the physical equation, it can be said that the sequential reward learning unit 310 generates a physical simulator.

The sequential reward learning unit 310 may generate a physical simulator using, for example, a neural network. For example, for a perceptron, the physical equation h(s, a), which is a simulated result determined according to the state s and the action a, may be input to the input layer, and the next state s' may be output at the output layer.

Alternatively, the sequential reward learning unit 310 may estimate the parameters by performing the maximum likelihood estimation of the Gaussian mixture distribution. Further alternatively, the sequential reward learning unit 310 may generate a physical simulator using a product model and a maximum entropy method.

Since the sequential reward learning unit 310 associates the reward function r(s, a) with the physical equation h(s, a) in this way, the sequential reward learning unit 310 can estimate the Boltzmann distribution as a result of estimating the physical equation using the method for estimating the reward function. That is, by giving the formulated function as the problem setting of the reinforcement learning, it becomes possible to estimate the parameters of the equation of motion in the framework of the reinforcement learning.

Furthermore, by the sequential reward learning unit 310 estimating the equation of motion, rules such as physical phenomena can be extracted from the estimated equation of motion, and existing equations of motion can be updated. The sequential reward learning unit 310 may generate the reward function and the policy function in a system A100 from the expert data set 110. Alternatively, the sequential reward learning unit 310 may generate the physical equation and state transition probability in the system A100 from the expert data set 110. Further, the sequential reward learning unit 310 may generate the policy function, the reward function, the physical equation, and the state transition probability in the system A100 from the expert data set 110.

In view of the foregoing, it is preferable that the first model according to this example embodiment include the policy function and the reward function. Here, the policy function and the reward function are generated by the sequential reward learning unit 310 using the action data in which the state vector indicating the state of the specific environment and the action taken by the specific agent in the state represented by the state vector are associated with each other. It can be said that the reward function outputs the reward obtained in the state represented by the state vector in response to the input of the state vector. Further, it can be said that the policy function inputs an output value of the reward function when the state vector is input, and outputs the action to be taken by the specific agent in the state represented by the state vector.

Further, it is preferable that the first model according to this example embodiment further include a physical equation associated with the reward function and a state transition probability associated with the policy function, the state transition probability following the Boltzmann distribution representing a probability distribution of the state that is predetermined.

The model correction unit 320 is an example of the generation unit 11 described above. The model correction unit 320 corrects the model A342 adapted to the system A100 using the correction model 343, generates the model B345, and stores the model B345 in the storage unit 340 or updates the model B345. Furthermore, before generating the model B345, the model correction unit 320 may calculate the correction model 343 using the operation data set 210 in the system B200. In this case, the model correction unit 320 may use the calculated correction model 343 to correct the model A342 to thereby generate the model B345.

The adaptation unit 330 acquires the operation data set 210 obtained by operating the system B200 using the model B345, and adapts the model B345 to the system B200 using the acquired operation data set 210. Here, the model B345 is generated from the model A342 adapted to the system A100 which is similar to the system B200. Therefore, compared with a case where the model B345 is newly generated (by the sequential reward learning unit 310) and sequential reward learning (or relearning) is performed, parameters can be learned with less amount of the operation data, and an accurate adaptive model can be efficiently obtained. That is, a model can be accurately adapted with a small amount of operation data. In addition, adaptation is possible in a short time at a low cost.

Figure 5:
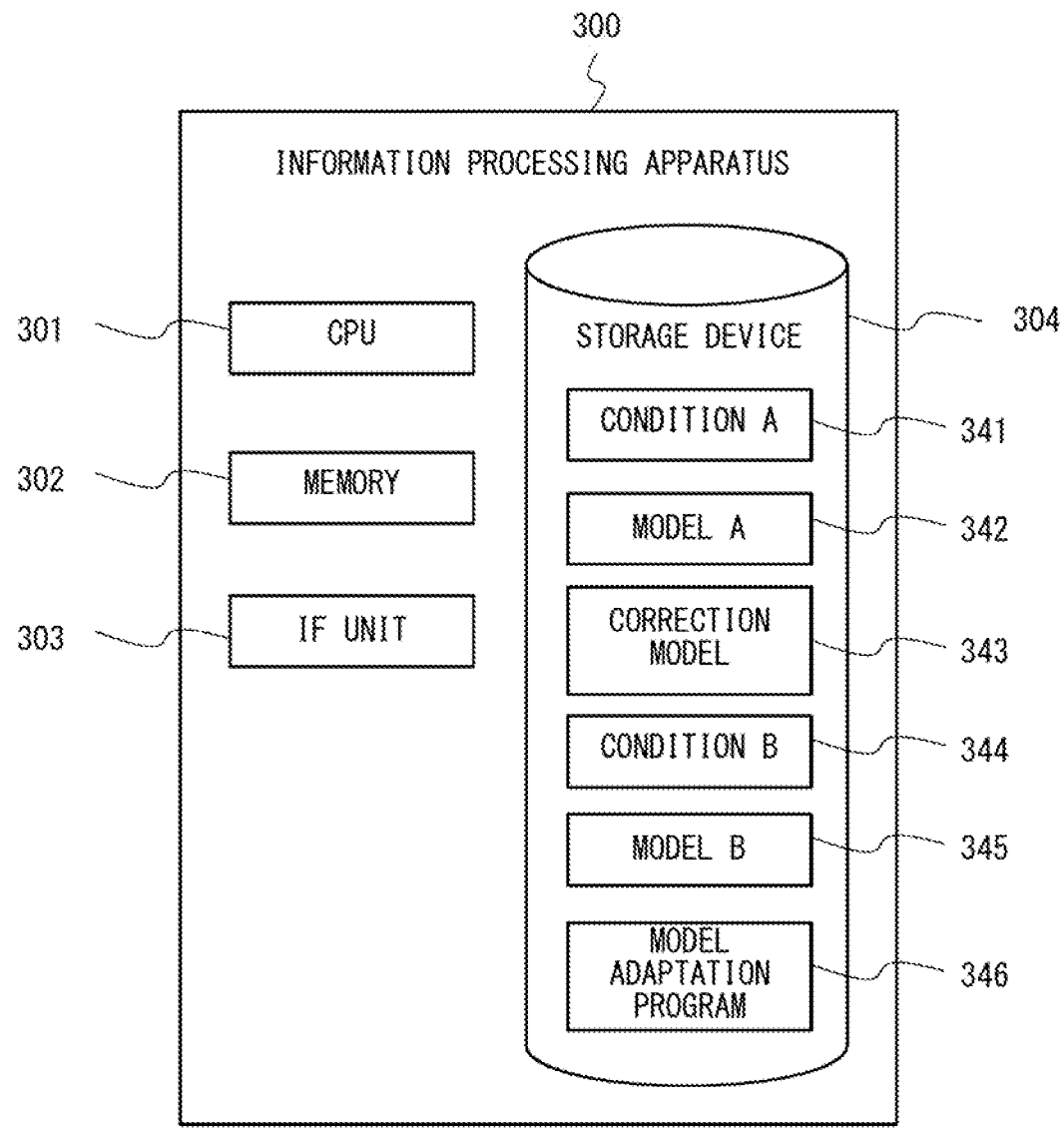
FIG. 5 is a block diagram showing a hardware configuration of the information processing apparatus according to the second example embodiment.

FIG. 5 is a block diagram showing a hardware configuration of the information processing apparatus 300 according to the second example embodiment. The information processing apparatus 300 includes at least a CPU 301, a memory 302, an IF unit 303, and a storage device 304. The storage device 304 is, for example, a hard disk or a flash memory corresponding to the storage unit 340 described above. In addition to the condition A341, the model A342, it is assumed that the correction model 343, the condition B344, and the model B345 described in FIG. 3, the storage device 304 stores a model adaptation program 346 not shown in FIG. 3. The model adaptation program 346 is a computer program in which the processing of the model adaptation method according to this example embodiment is implemented.

The memory 302 is a volatile storage device such as a RAM (Random Access Memory), and is a storage area for temporarily holding information during the operation of the CPU 301. The IF unit 303 is an interface for input/output to/from the outside of the information processing apparatus 300. For example, the IF unit 303 receives a user operation via an input device (not shown) such as a keyboard, a mouse, and a touch panel, and outputs the received operation content to the CPU 301. In response to an instruction from the CPU 301, the IF unit 303 returns an output to a touch panel, a display device, a printer, or the like (not shown).

The CPU 301 is a processor for controlling each component of the information processing apparatus 300, namely, a control apparatus. The CPU 301 reads the model adaptation program 346 from the storage device 304 into the memory 302, and executes the model adaptation program 346. By doing so, the CPU 301 realizes the functions of the sequential reward learning unit 310, the model correction unit 320, and the adaptation unit 330.

Figure 6:
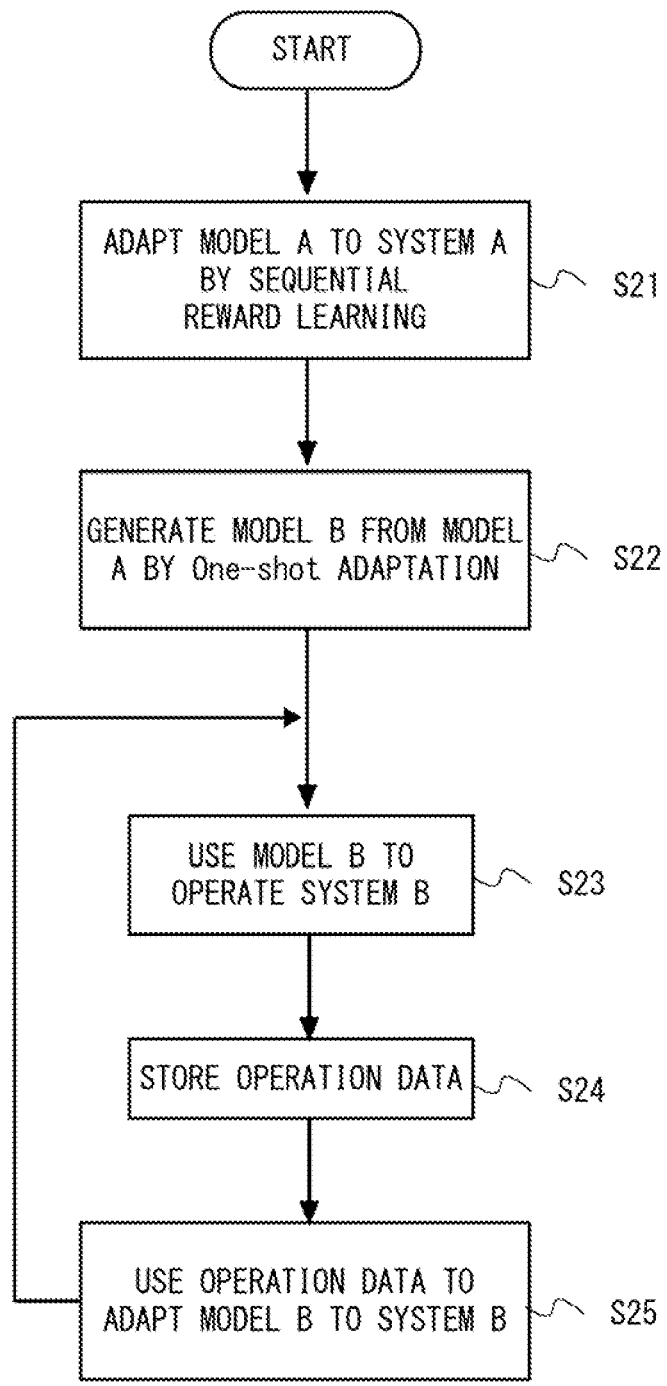
FIG. 6 is a flowchart showing a flow of a model adaptation method according to the second example embodiment.

FIG. 6 is a flowchart showing a flow of a model adaptation method according to the second example embodiment. First, the sequential reward learning unit 310 adapts the model A342 to the system A100 by the sequential reward learning using the expert data set 110 (S21). The sequential reward learning unit 310 may include the generation of the model A342 in this step. Then, the sequential reward learning unit 310 stores in the storage unit 340 the model A342 in which the adapted parameter values are set.

Next, the model correction unit 320 generates the model B345 from the model A342 by one-shot adaptation (S22). For example, first, the model correction unit 320 calculates the correction model 343 based on a condition B344. Then, the model correction unit 320 multiplies the correction model 343 by the model A342 to calculate the model B345, and stores the model B345 in the storage unit 340.

For example, the model correction unit 320 may calculate the model B345 as follows. First, it is assumed that the model A342 includes the policy function $\pi_A$ (Formula 9) and the state transition probability $p_A$ (Formula 10) of the system A100 in the condition A341.

[Equation 6]

$$\pi_A(a|s) := \pi(a|r_A(s,a)) \qquad \text{(Formula 9)}$$

[Equation 7]

$$p_A(a|s) := p(s|h_A(s,a)) \qquad \text{(Formula 10)}$$

The correction model 343 includes parameter functions $\alpha(s, a)$ and $\beta(s', s, a)$ that use the state s and the action a.

Next, the model correction unit 320 reads the policy function $\pi_A$ and the state transition probability $p_A$ of the model A342 and the parameter functions $\alpha$ and $\beta$ of the correction model 343 from the storage unit 340. Then, the model correction unit 320 multiplies the policy function $\pi_A$ by the parameter function $\alpha$ to obtain a policy function $\pi_{A'}$ (Formula 11), and multiplies the state transition probability $p_A$ by the parameter function $\beta$ to obtain a state transition probability $p_{A'}$ (Formula 12).

[Equation 8]

$$\pi_{A'}(s'|s,a) := \alpha(s,a)\pi_A(a|s) \qquad \text{(Formula 11)}$$

$$p_{A'}(s'|s,a) := \beta(s',s,a)p_A(s'|s,a) \qquad \text{(Formula 12)}$$

Then, the model correction unit 320 stores in the storage unit 340 the calculated policy function $\pi_{A'}$ and the state transition probability $p_{A'}$ as the model B345.

In Step S22, it is assumed that one-shot adaptation is performed. For example, when the distribution of the parameter function based on the condition A341 and the distribution of the parameter function based on the condition B344 are given in advance, the model correction unit 320 may calculate the correction model 343 and its parameter values based on these distributions. Specifically, when there is a small amount of operation data when the system B200 based on the condition B344 is operated, the model correction unit 320 may calculate the correction model 343 and its parameter values using the operation data. That is, the model correction unit 320 may learn about the model B345 obtained by multiplying the model A342 by the correction model 343 using a small amount of operation data to generate the model B345.

In Step S22, zero-shot adaptation or few-shot adaptation may be used instead of the one-shot adaptation described above. For example, in the case of the zero-shot adaptation, the model correction unit 320 generates the model B345 by multiplying the model A342 and performing an initial update to adapt the A342 to the system B200 even in a situation where there is no additional data by assuming a portion which does not change such as the parameter functions $\alpha(s, a) = \beta(s', s, a) = 1$ and $\beta(s', s, a) = 1$.

Alternatively, in the case of the few-shot adaptation, the model correction unit 320 multiplies the model A342 by the parameter functions $\alpha$ and $\beta$ to generate the model B345, and then adapts the model B345 to the system B200 several times to acquire a small amount of operation data. After that, the model correction unit 320 uses the acquired small amount of operation data to adapt the model B345 to the system B200, and updates the parameter values to thereby generate the model B345. Thus, it can be said that the one-shot adaptation, the zero-shot adaptation, or the few-shot adaptation are collectively referred to as X-shot adaptation, and the model correction unit 320 according to this example embodiment generates the model B345 by the X-shot adaptation.

Next, the adaptation unit 330 uses the model B345 to operate the system B200 (S23). The adaptation unit 330 stores the operation data generated by the operation in Step S23 as the operation data set 210 (S24). After that, the adaptation unit 330 uses the operation data set 210 to adapt the model B345 to the system B200 (S25). At this time, the adaptation unit 330 adjusts (optimizes) the parameter values of the model B345 by the sequential reward learning in a manner similar to the sequential reward learning unit 310, and stores in the storage unit 340 or updates the model B345 in which the adjusted parameters are set. From this processing onward, the adaptation unit 330 adapts and updates the model B345 according to the operation of the system B200.

As described above, in this example embodiment, in Step S22, the initial parameters of the correction model 343 can be quickly adjusted (or set). Then, the model B345 can be appropriately learned using the actual operation data during the operation of the system B200. Thus, the model B345 adapted to the system B200 can be provided more quickly.

For example, an enormous number of expert data sets are required to generate an adaptive model of the system B200 using the sequential reward learning unit 310, thereby requiring a long time to accumulate such enormous number of expert data sets. It also requires a long time to learn the adaptive model using the expert data sets. Further, the adaptive model learned by the sequential reward learning unit 310 for the system A100 assumes the condition A341 including the specific environment and the specific agent, and does not assume that the environment or the agent is changed. In particular, the adaptive model learned by the sequential reward learning unit 310 for the system A100 cannot support the case where both the environment and the agent are changed in the condition A341. Therefore, the condition A341 and the condition B344 in which one of the environment and agent is changed, i.e., the model A342 cannot be used as it is for the system B200 which is similar to the system A100. This is because if the model A342 is used as it is for the system B200, an unintended output may be returned.

Thus, according to this example embodiment, by using the model B345 obtained by correcting the model A342 using the correction model 343, the model adapted to the system B200 can be provided quickly and at a low cost.

According to this example embodiment, the generated model B345 can be autonomously updated with model parameters during an actual operation. Further, in the second example embodiment, the second model may be generated for a plurality of the systems B200.

Third Example Embodiment

A third example embodiment is a specific example of the first example embodiment described above, and is an example embodiment different from the second example embodiment described above. In the third example embodiment, the second model is generated more quickly than that in the second example embodiment by correcting the evaluation criterion (expression) included in the first model, instead of correcting the entire first model. In the third example embodiment, an example of developing the first model into a plurality of similar systems will be described. However, the third example embodiment may be applied to a single similar system.

Figure 7:
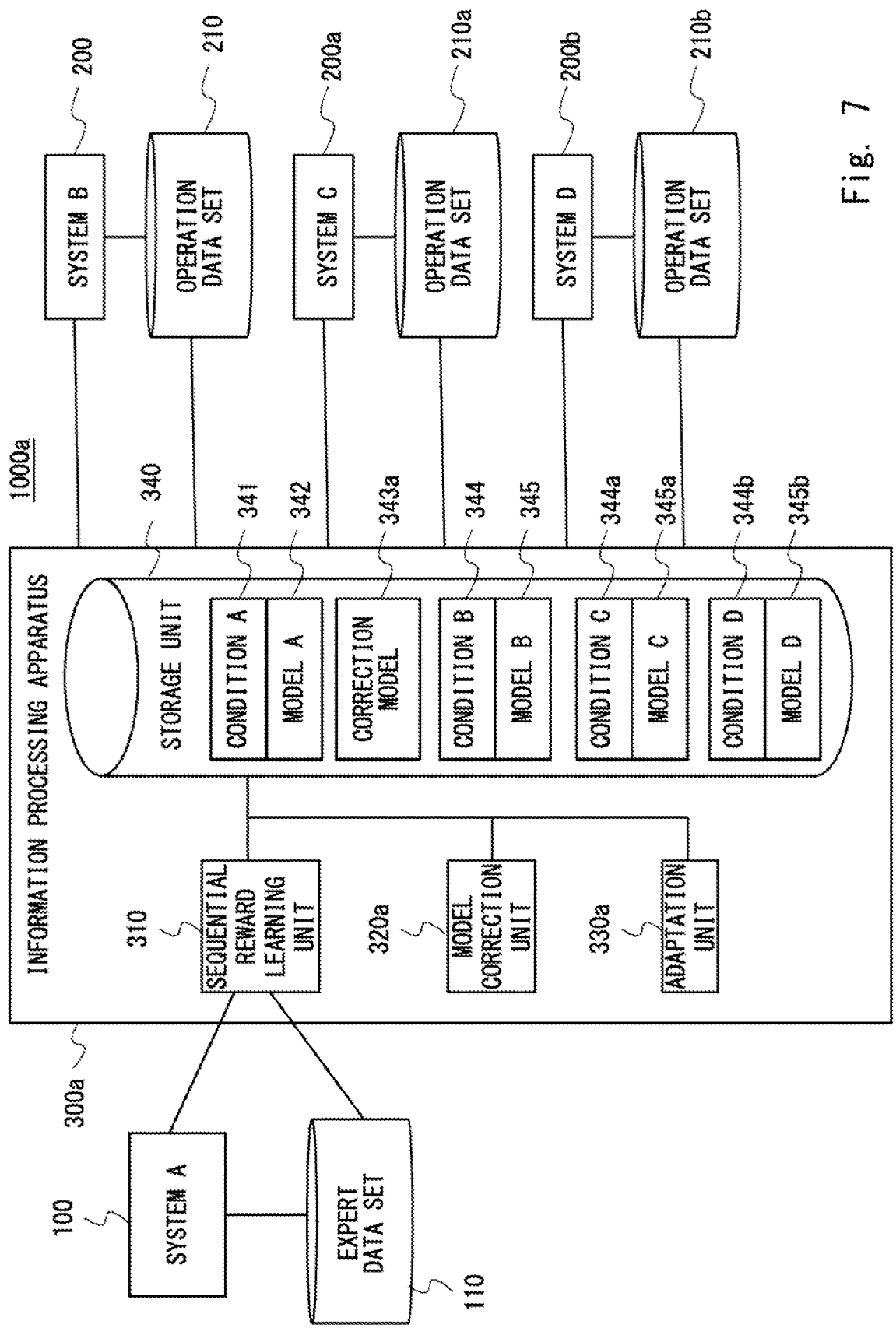
FIG. 7 is a block diagram showing an overall configuration of an information processing system according to a third example embodiment.

FIG. 7 is a block diagram showing an overall configuration of an information processing system 1000a according to the third example embodiment. In the information processing system 1000a, as compared with the information processing system 1000, the information processing apparatus 300 is replaced with an information processing apparatus 300a, and a system C200a, an operation data set 210a, the system D200b, and an operation data set 210b are further included. The same components as those shown in FIG. 3 are denoted by the same reference signs, and the description of those components will be omitted.

The system C200a and system D200b are examples of a third system which is similar to the system A100 which is like the system B200. It is assumed that the system B200, the system C200a, and the system D200b are similar systems. For example, when the system B200, the system C200a, and the system D200b are store systems, the difference in the environments of these systems corresponds to the case where the locations of stores (surrounding environments) are different and the managers (agents) who operate the systems are different. The operation data set 210a is a set of data when the system C200a is operated, and the operation data set 210b is a set of data when the system D200b is operated.

The difference between the information processing apparatus 300a and the information processing apparatus 300 will be described. First, as compared with FIG. 3, in the storage unit 340, the correction model 343 is replaced with a correction model 343a, and the storage unit 340 further stores a condition C344a, a model C345a, a condition D344b, and a model D345b. The correction model 343a is an example of the above-mentioned correction model, and is a set of correction parameters in this example embodiment. However, the correction model 343a is not limited to this. The condition C344a is information indicating a set of the target environment 101 and the agent 102 when the system C200a is operated. The condition D344b is information indicating a set of the target environment 101 and the agent 102 when the system D200b is operated. When the condition B344 is defined as the second condition, at least one of the condition C344a and the condition D344b can be referred to as a third condition which is partially different from both the condition A341 and condition B344.

The model C345a is an information group indicating a model expression including parameter values before or after adaptation to the system C200a. Likewise, the model D345b is an information group indicating a model expression including parameter values before or after adaptation to the system D200b. The model C345a and the model D345b before adaptation may be the same as the model B345 before adaptation.

The model correction unit 320a corrects the evaluation criterion for evaluating the action 103 of the agent 102 included in the model A342 using the correction model 343 in addition to the correction performed by the model correction unit 320 described above. Since there are fewer objects to be corrected than that in the second example embodiment, the processing time can be shortened and the second model can be generated more quickly. Further, the model correction unit 320a uses the correction parameter for correcting the parameter of the evaluation criterion as the correction model 343 to thereby generate the model B345 (the model C345a and the model D345b). In this manner, by modifying the parameter values optimized for the first system, the modification amount of the first model is reduced, and the existing first model can be effectively utilized.

An adaptation unit 330a, like the adaptation unit 330, adapts the model B345 to the system B200. Further, the adaptation unit 330a acquires the operation data set 210a obtained by operating the system C200a using the model C345a, and adapts the model C345a to the system C200a using the acquired operation data set 210a. The adaptation unit 330a acquires the operation data set 210b obtained by operating the system D200b using the model D345b, and adapts the model D345b to the system D200b using the acquired operation data set 210b.

Figure 8:
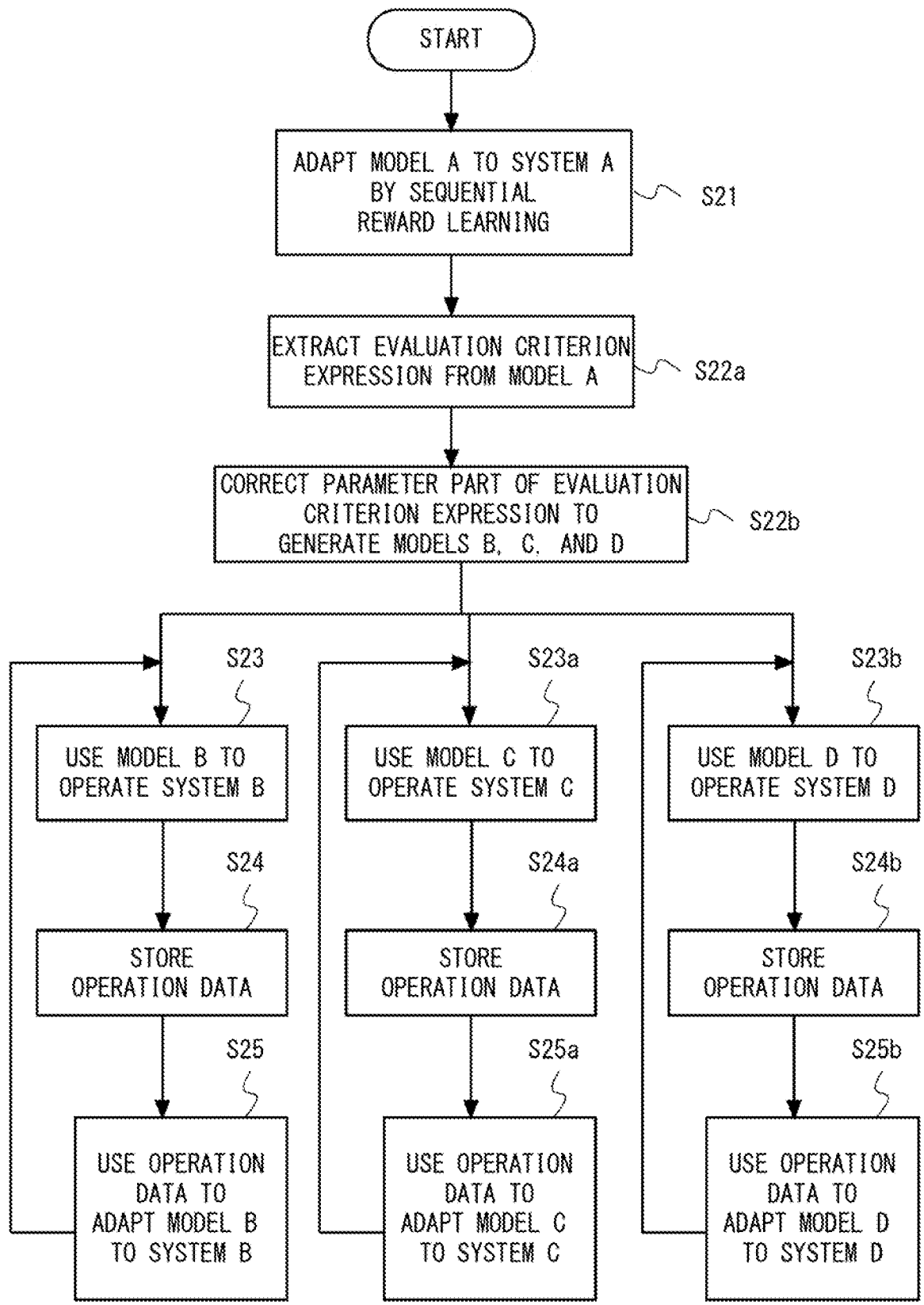
FIG. 8 is a flowchart showing a flow of a model adaptation method according to the third example embodiment.

FIG. 8 is a flowchart showing a flow of a model adaptation method according to the third example embodiment. First, in a manner similar to FIG. 6, the sequential reward learning unit 310 adapts the model A342 to the system A100 by the sequential reward learning using the expert data set 110 (S21). Next, the model correction unit 320a extracts an evaluation criterion expression from the model A342 (S22a). For example, it is assumed that the model A342 includes the policy function $\pi_A$ shown in Formula 9 and the state transition probability $p_A$ shown in Formula 10. In this case, the model correction unit 320a extracts a reward function $r_A(s, a)$ from the policy function $\pi_A$ as the evaluation criterion expression, and extracts a physical equation $h_A(s, a)$ from the state transition probability $p_A$.

Then, the model correction unit 320a corrects the parameter part of the evaluation criterion expression using the correction model 343a to generate the model B345, the model C345a, and the model D345b (S22b). The model correction unit 320a stores the generated model B345, model C345a, and model D345b in the storage unit 340. The correction model 343a is generated in advance based on the conditions B344, C344a, and D344b.

For example, as shown in the following Formula 13, the model correction unit 320a adds a correction parameter $\delta_{r_{A'}}$ to the extracted reward function $r_A(s, a)$, which is the evaluation criterion expression, to calculate the reward function $r_A'(s, a)$.

[Equation 9]

$$r_A'(s,a) = r_A(s,a) + \delta_{r_{A'}} \quad \text{(Formula 13)}$$

Further, as shown in the following Formula 14, the model correction unit 320a adds the correction parameter $\delta_{h_{A'}}$ to the physical equation $h_A(s, a)$, which is the extracted evaluation criterion expression, to calculate the physical equation $h_A'(s, a)$.

[Equation 10]

$$h_A'(s,a) = h_A(s,a) + \delta_{h_{A'}} \quad \text{(Formula 14)}$$

More specifically, when the reward function $r_A(s, a)$, which is one of the evaluation criterion expressions of the model A342, is the following Formula 15, the reward function $r_A'(s, a)$ to which the correction parameter $\delta_{r_{A'}}$ is added can be calculated as shown in the following Formula 16.

[Equation 11]

$$r_A(s, a) = \sum_{i}^{N} \theta_i' s_i + \sum_{j=N+1} \theta_j' a_j + \lambda' g'(\theta') \quad \text{(Formula 15)}$$

[Equation 12]

$$r_A'(s, a) = \sum_{i}^{N} (\theta_i' + \delta\theta_i') s_i + \sum_{j=N+1} (\theta_j' + \delta\theta_j') a_j + \lambda' g'(\theta') \quad \text{(Formula 16)}$$

That is, the corrected reward function $r_A'(s, a)$ indicates that the correction parameter is added to each of the state $s_i$ and the action $a_i$ in the reward function $r_A(s, a)$ before the correction.

Likewise, when the physical equation $h_A(s, a)$, which is one of the evaluation criterion expressions of the model A342, is the following Formula 17, the physical equation $h_A(s, a)$ to which the correction parameter $\delta_{h_{A'}}$ is added can be calculated as shown in the following Formula 18.

[Equation 13]

$$h_A(s, a) = \sum_{i,j}^{N} \theta_{ij} s_i s_j + \sum_{k=2N+1} \theta_k a_k + \lambda g(\theta) \quad \text{(Formula 17)}$$

[Equation 14]

$$h_A'(s, a) = \sum_{i,j}^{N} (\theta_{ij} + \delta\theta_{ij}) s_i s_j + \sum_{k=2N+1} (\theta_k + \delta\theta_k) a_k + \lambda g(\theta) \quad \text{(Formula 18)}$$

Then, the model correction unit 320a includes the evaluation criterion expression thus corrected in the model A342 to generate the model B345 and the like. Here, if the correction parameters $\delta_{r_{A'}}$ and $\delta_{h_{A'}}$ are common among the system B200, the system C200a, and the system D200b, the model B345, the model C345a, and the model D345b may be the same at this stage.

For example, it is assumed that the model B345 or the like include the policy function $\pi_{A'}$ shown in the following Formula 19 and the state transition probability $p_{A'}$ shown in the following Formula 20.

[Equation 15]

$$\pi_{A'}(a|s) := \pi(a|r_A'(s,a)) \quad \text{(Formula 19)}$$

[Equation 16]

$$p_{A'}(s'|s,a) := p(s'|h_A'(s,a)) \quad \text{(Formula 20)}$$

After that, the adaptation unit 330a uses the model B345 to operate the system B200 (S23). The adaptation unit 330 stores the operation data generated by the operation in Step S23 as the operation data set 210 (S24). After that, the adaptation unit 330 uses the operation data set 210 to adapt the model B345 to the system B200 (S25). At this time, the adaptation unit 330 adjusts (optimizes) the parameter values of the model B345 by the sequential reward learning in a manner similar to the sequential reward learning unit 310, and stores in the storage unit 340 or updates the model B345 in which the adjusted parameters are set.

In parallel with Steps S23 to S25, the adaptation unit 330a operates the system C200a using the model C345a (S23a). The adaptation unit 330a stores the operation data generated by the operation in Step S23a as the operation data set 210a (S24a). After that, the adaptation unit 330a uses the operation data set 210a to adapt the model C345a to the system C200a (S25a). At this time, the adaptation unit 330a adjusts (optimizes) the parameter values of the model C345a by the sequential reward learning in a manner similar to the sequential reward learning unit 310, and stores in the storage unit 340 or updates the model C345a in which the adjusted parameters are set.

In parallel with Steps S23 to S25 and Steps S23a to S25a, the adaptation unit 330a uses the model D345b to operate the system D200b (S23b). The adaptation unit 330a stores the operation data generated by the operation in Step S23b as the operation data set 210b (S24b). After that, the adaptation unit 330a uses the operation data set 210b to adapt the model D345b to the system D200b (S25b). At this time, the adaptation unit 330a adjusts (optimizes) the parameter values of the model D345b by the sequential reward learning in a manner similar to the sequential reward learning unit 310, and stores in the storage unit 340 or updates the model D345b in which the adjusted parameters are set.

As described above, in the third example embodiment, the second model can be generated more quickly by correcting the evaluation criterion (expression) included in the first model instead of correcting the entire first model. Further, since the adapted parameter values included in the first model are corrected, it is possible to adapt the parameter values with high accuracy while minimizing the amount of correction. Furthermore, when the second model is adapted, since learning is possible with a small amount of operation data, for example, adaptation (updating model parameters) can be performed with high accuracy and at a high speed with a small amount of operation data obtained right after the transition of the system or right after the start of the operation.

The correction model 343a described above may be a plurality of correction models corresponding to the system B200, the system C200a, and the system D200b, respectively. The correction model 343a may be a random value or a value based on a probability distribution of a model corresponding to each of the system B200, the system C200a, and the system D200b.

In this case, the model correction unit 320a (the generation unit) corrects the model A342 (the first model) using a first correction model corresponding to the condition B344 (the second condition) to thereby generate the model B345 (the second model). Then, the model correction unit 320a corrects the model A342 using a second correction model corresponding to the condition C344a (the third condition) that is partially different from both the conditions A341 and B344 to thereby generate the model C345a (the third model). The model correction unit 320a corrects the model A342 using a correction model corresponding to a condition D344b that is partially different from all of the conditions A341, B344, and C344a to thereby generate the model D345b. After that, the adaptation unit 330a adapts the model B345 to the system B200 (the second system), adapts the model C345a to the system C200a (the third system), and adapts the model D345b to the system D200b.

Fourth Example Embodiment

A fourth example embodiment is an improved example of the third example embodiment. In the fourth example embodiment, the generation unit generates a fourth model by correcting, using the correction model, the fourth model adapted to a fourth system operated based on a fourth condition which is partially different from the first condition. The adaptation unit adapts the fourth model to the fourth system operated based on the fourth condition. The information processing apparatus further includes an output unit for outputting a comparison result between the second model and the fourth model adapted by the adaptation unit.

Figure 9:
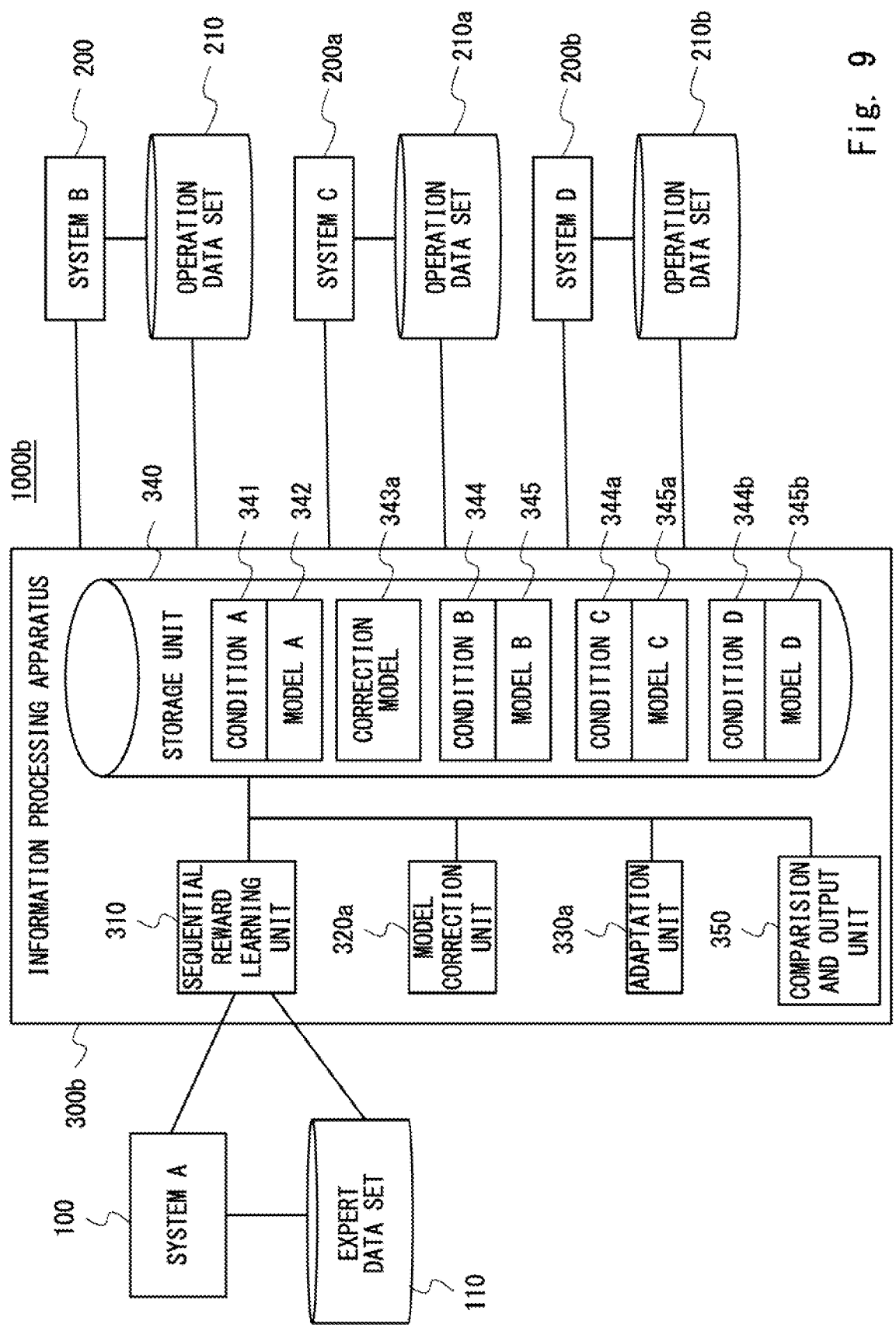
FIG. 9 is a block diagram showing an overall configuration of an information processing system according to a fourth example embodiment.

FIG. 9 is a block diagram showing an overall configuration of an information processing system 1000b according to the fourth example embodiment. In the information processing system 1000b, as compared with the information processing apparatus 1000a, the information processing apparatus 300a is replaced with an information processing system 300b. The information processing apparatus 300b further includes a comparison and output unit 350 in addition to the components of the information processing apparatus 300a. The comparison and output unit 350 compares the model B345, the model C345a, and the model D345b which have been adapted by the adaptation unit 330a, and outputs the comparison result. Here, the comparison result includes information indicating differences between actions or states constituting the models, differences between parameter values in the corresponding actions or states, differences between conditions of the models, and the like. The model correction unit 320a may perform the X-shot adaptation in the manner similar to that in the second example embodiment. The comparison and output unit 350 may compare the model A342 (the first model) with other models and output the comparison result. The same components as those shown in FIG. 7 are denoted by the same reference signs, and the description of those components will be omitted.

Figure 10:
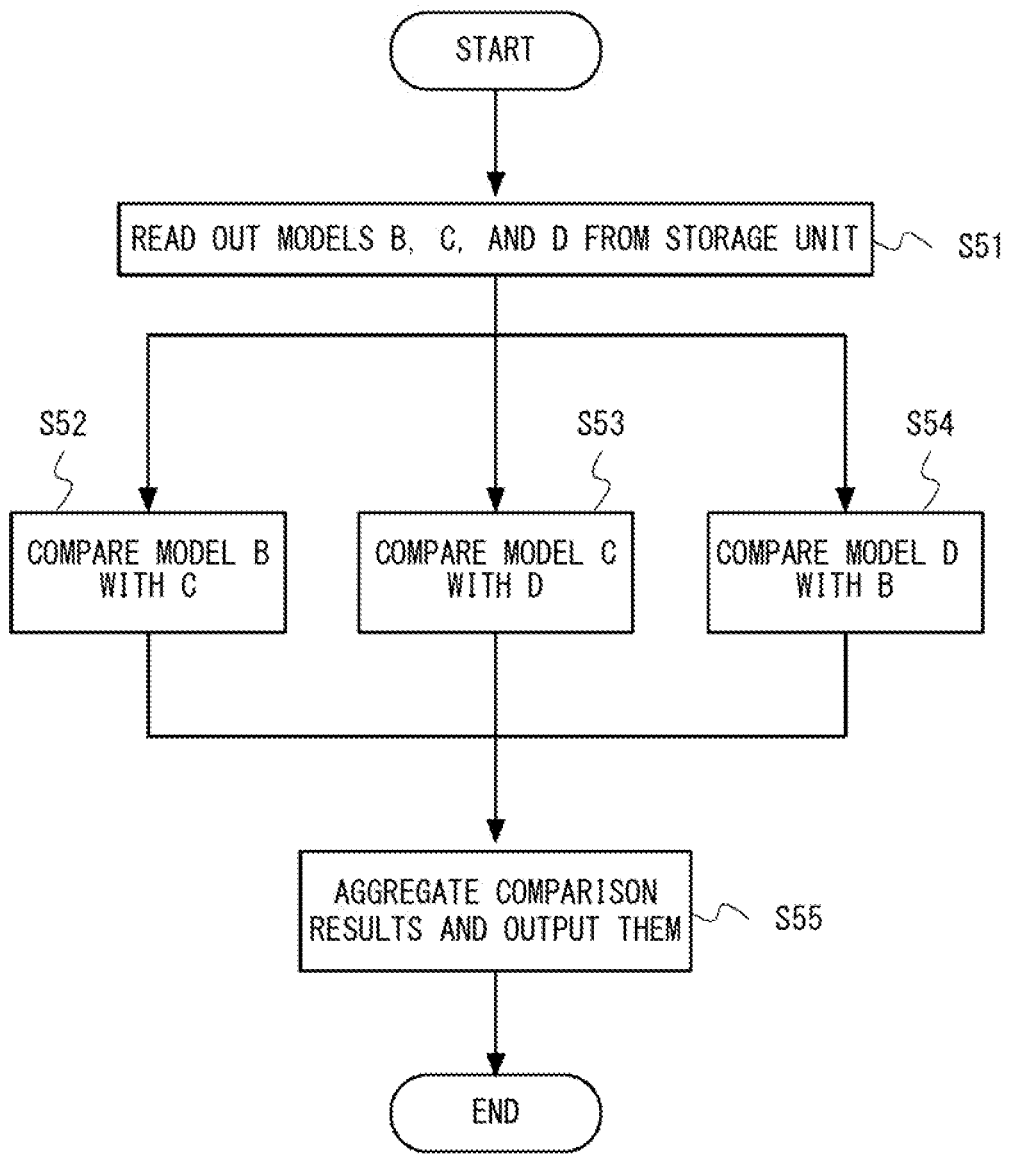
FIG. 10 is a flowchart showing a flow of model comparison processing according to the fourth example embodiment.

FIG. 10 is a flowchart showing a flow of the model comparison processing according to the fourth example embodiment. The model comparison processing is executed after the model adaptation method of FIG. 8 described above. First, the comparison and output unit 350 reads out the model B345, the model C345a, and the model D345b from the storage unit 340 (S51). Next, the comparison and output unit 350 processes Steps S52, S53, and S54 in any order or in parallel as appropriate.

In Step S52, the comparison and output unit 350 compares the model B345 with the model C345a to obtain a comparison result. In Step S53, the comparison and output unit 350 compares the model C345a with the model D345b to obtain a comparison result. In Step S54, the comparison and output unit 350 compares the model D345b with the model B345 to obtain a comparison result.

After Steps S52 to S54, the comparison and output unit 350 aggregates the comparison results and outputs them (or outputs the comparison results separately) (S55). For example, the comparison and output unit 350 may display each comparison result on a screen of the information processing apparatus 300b (not shown). Alternatively, the comparison and output unit 350 may store each comparison result in the storage unit 340. Further alternatively, the comparison and output unit 350 may output each comparison result to an external storage device, a computer, or a display device (via a network).

According to this example embodiment, it is possible to explicitly compare the mechanisms (e.g., physical equations) and the intentions (the reward functions) of the operations of the system B200, the system C200a, and the system D200b that are similar to each other with some of conditions different from each other. Furthermore, using the generated evaluation criterion expression, universal behavior common to the systems, improvement of the operation method, and accuracy improvement by ensemble become possible. Furthermore, by adding the first model (the model A342) as a model to be compared with, an analysis including the system A100 becomes possible.

Fifth Example Embodiment

A fifth example embodiment is an application example of the third or fourth example embodiment described above.

The fifth example embodiment is an example applied to an automatic driving system. In general, safety standards are not clear for driving on community roads. Therefore, the fifth example embodiment aims at autonomously learning the driving operation of an automobile from the driving history of a person on community roads and realizing safe automatic driving on the community roads. In particular, the following description covers lane changes.

Figure 11:
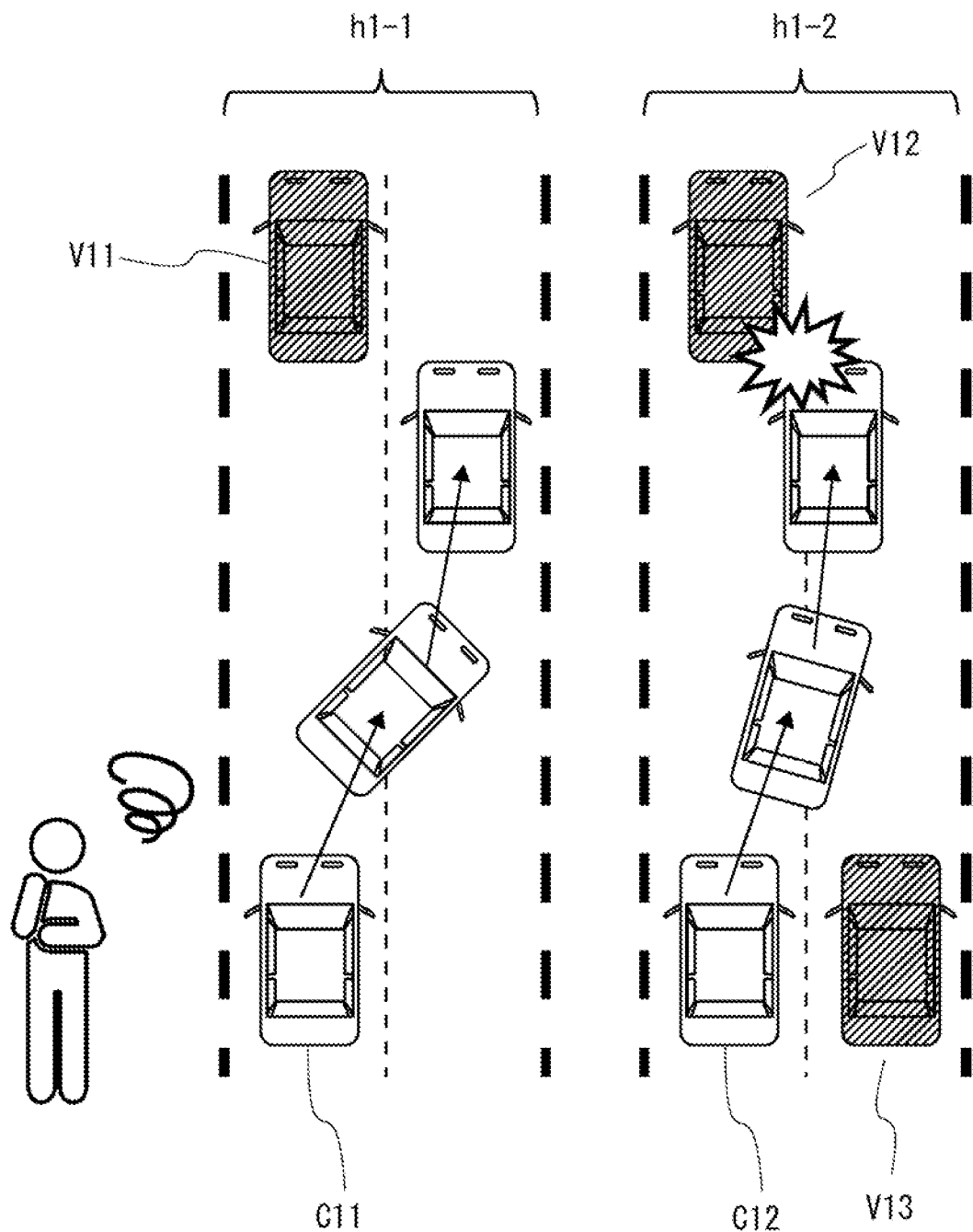
FIG. 11 is a diagram for explaining an example of a lane change in driving an automobile.

FIG. 11 is a diagram for explaining an example of a lane change in driving a vehicle. A case h1-1 shows one that when a vehicle V11 is present (e.g., parking or driving) ahead of a driving vehicle C11 (the vehicle V11 is in the same lane that the driving vehicle C11 is in), the driving vehicle C11 has safely moved to the adjacent lane without coming into contact with the vehicle V11 ahead. At this time, it is assumed that a driver of the driving vehicle C11, in order to avoid the vehicle V11 ahead, has operated the steering wheel so as to move the driving vehicle C11 to the adjacent lane, and also operated the accelerator and brake as necessary. These driving operations by the driver are the actions 103 of the agent 102. The target environment 101 (a driving environment) includes a type (truck, ordinary vehicle, etc.) and a size of the driving vehicle, information about surrounding vehicles (the number, locations, types, and sizes of the surrounding vehicles, etc.), traffic volume, the time of day, and weather (brightness), information about roads (the number of lanes, vehicle width, traffic lights, curves), and so on. For example, in the case h1-1, the facts that the lane that the driving vehicle C11 is is driving in the left lane and the vehicle V11 is present ahead of the driving vehicle C11 in the same lane that the driving vehicle C11 is in, the distance between the vehicle V11 and the driving vehicle C11, the number of lanes, the slope of the road, the angle of curve, and so on are the states 104 in the target environment 101. Therefore, the action 103 and the state 104 in the case h1-1 are the operation data. In the case h1-1, since no accident has occurred, the driver of the driving vehicle C11 is regarded as the skilled person, and the operation data in the case h1-1 can be used as the expert data.

A case h1-2 is one where a vehicle V12 is present ahead of a driving vehicle C12 (in the same lane that the driving vehicle C12 is in) and the vehicle V13 is present right next to (in an adjacent lane) the driving vehicle C13. At this time, it is shown that the driving vehicle C12 has changed the lanes without coming into contact with the vehicle V13 right next to the driving vehicle C12, but the vehicle C12 has come into contact with the vehicle V12 ahead of the driving vehicle C12. The operation data (the steering wheel operation and the presence of the vehicle V13 and so on) at this time is different from the operation data in the case h1-1. In the case h1-2, since an accident has occurred, the driver of the driving vehicle C12 is excluded from the expert, and the operation data in the case h1-2 is not used as the expert data.

In other words, in order to make a safe lane change, it is important that a skilled person drives the vehicle (the action). On the other hand, it can be said that the driving environment has a great influence on whether lane changes can be made safely. Thus, it is important to pair the driving operation of the skilled person with the environmental information at that time as the expert data. Then, the pieces of the expert data of the lane changes are accumulated, and by the sequential reward learning unit 310 sequentially reward learning using these pieces of the expert data of the lane changes, the adapted first model can be generated. When the adapted first model of the lane change in a certain road (the driver and environment) is generated, the model correction unit 320a or the like corrects the first model using the correction model to generate the second model. The adaptation unit 330a and the like can generate safe lane change models in various roads by adapting the second model to the lane change operation of the roads under conditions (the driver and environment (place, etc.) other than the above condition).

Figure 12:
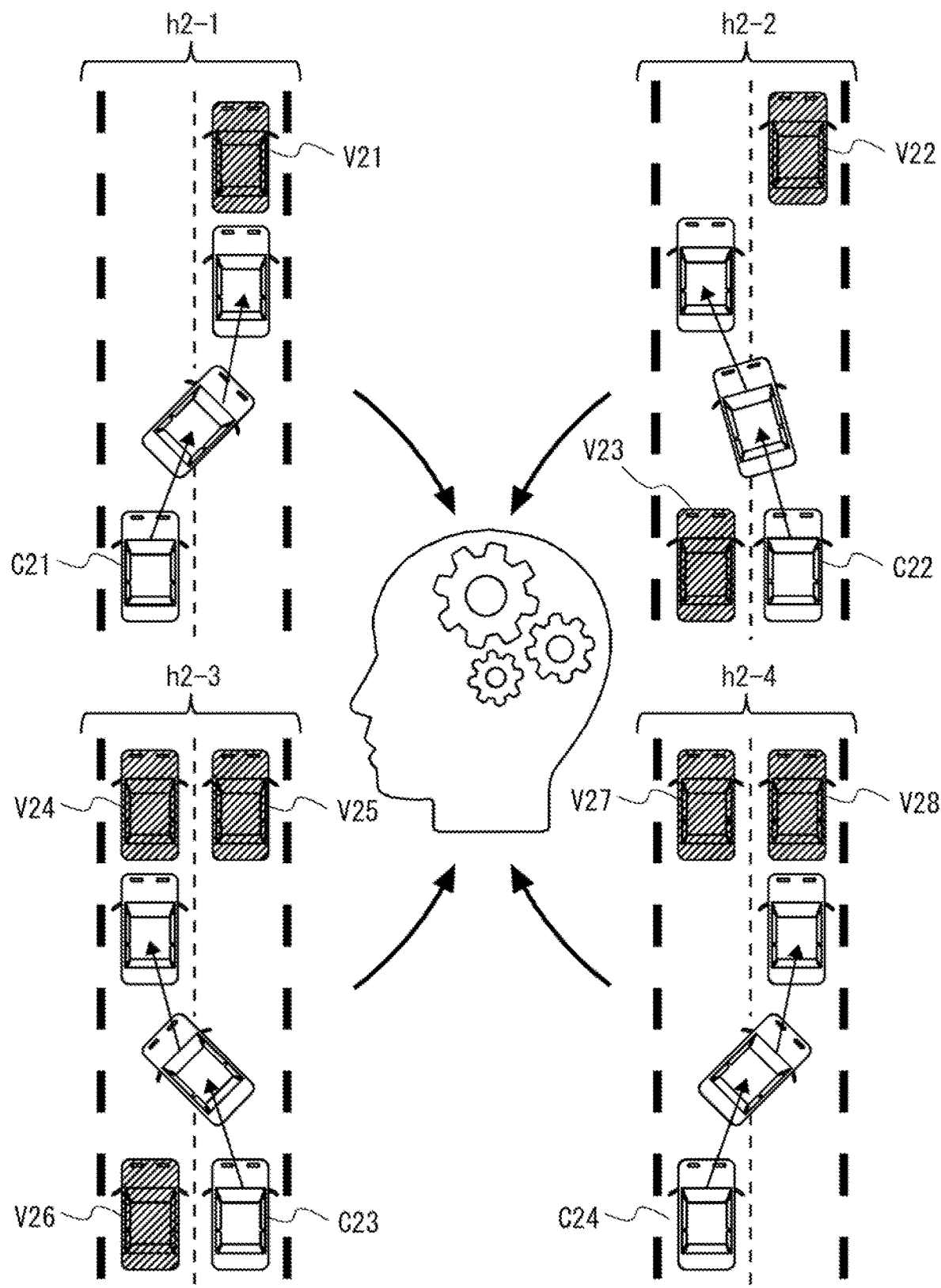
FIG. 12 is a diagram for explaining a concept of model generation of a driving technique according to a fifth example embodiment.

FIG. 12 is a diagram for explaining a concept of model generation of the driving technique according to the fifth example embodiment. A case h2-1 is one where no other vehicle is present ahead of a driving vehicle C21, but a vehicle V21 is present in an adjacent lane. At this time, it is shown that the driving vehicle C21 has changed the lanes and approaches safely to the rear of the vehicle V21. A case h2-2 is one in which a vehicle V22 is present ahead of a driving vehicle C22, a vehicle V23 is present right next to the driving vehicle C22, and no other vehicle is present ahead of the vehicle V23. At this time, it is shown that the driving vehicle C22 has safely moved to the adjacent lane without coming into contact with the vehicle V22 ahead and the vehicle V23 right next to the driving vehicle C22. A case h2-3 is one where vehicles V24 and V25 are present in both lanes ahead of the driving vehicle C23, and a vehicle V26 is present right next to the driving vehicle C23. At this time, it is shown that the driving vehicle C23 has changed the lanes without coming into contact with the vehicle V26 right next to the driving vehicle C23 and approaches safely to the rear of the vehicle V24. A case h2-4 is one where vehicles V27 and V28 are present in both lanes ahead of the driving vehicle C24. At this time, it is shown that the driving vehicle C24 has changed the lanes and approached safely to the rear of the vehicle V28. That is, the operation data in the cases h2-1 to h2-4 can be regarded as an example of the expert data. The sequential reward learning unit 310, the model correction unit 320a, the adaptation unit 330a, and the like can autonomously learn from these pieces of the expert data as appropriate to generate the lane change model that can be used on various roads.

Figure 13:
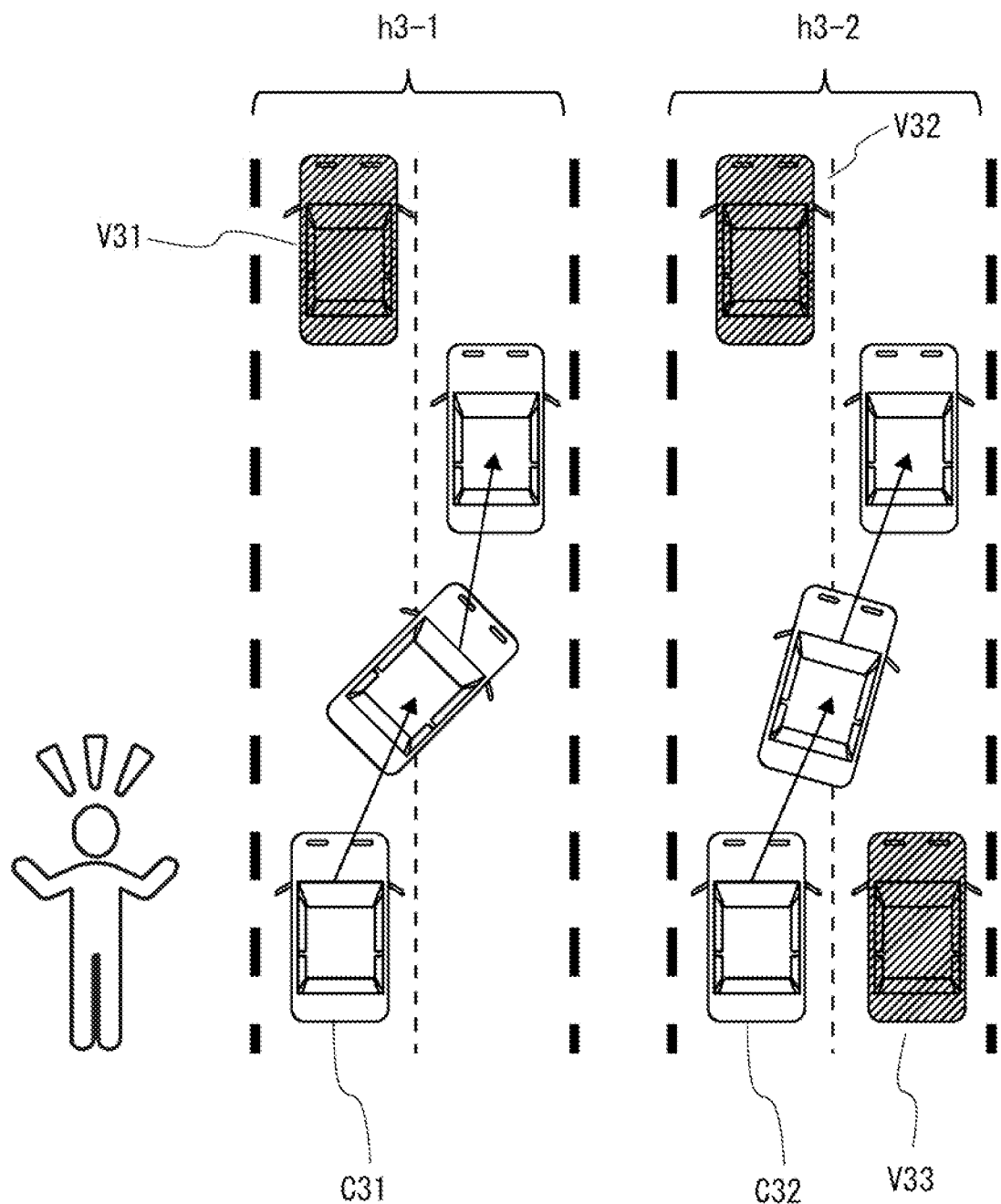
FIG. 13 is a diagram for explaining a concept when a model is applied to other roads according to the fifth example embodiment.

FIG. 13 is a diagram for explaining a concept when a model is applied to other roads according to the fifth example embodiment. A case h3-1 shows the progress in which, when a vehicle V31 is present ahead of a driving vehicle C31 (the vehicle V31 is in the same lane that the driving vehicle C31 is in), the lane change model adapted by the adaptation unit 330a or the like is used to automatically drive the driving vehicle C31 and change the lane that the driving vehicle C31 is in. Further, a case h3-2 shows a progress in which, when a vehicle V32 is preset ahead of a driving vehicle C32 (the vehicle V32 is in the same lane that the driving vehicle C32 is in) and a vehicle V33 is present right next to the driving vehicle C32, the lane change model adapted by the adaptation unit 330a or the like is used to automatically drive the driving vehicle C32 and change the lane that the driving vehicle C32 is in. The cases h3-1 and h3-2 show that the lane changes have been safely performed.

Furthermore, by applying the model comparison processing according to the fourth example embodiment, it is possible to extract features of a general-purpose lane change model. For example, from the comparison results of a plurality of lane change models generated according to the fifth example embodiment, an environment (condition) and a driving operation (action) for safe lane change such as "When the distance between cars becomes x meters, reduce the speed to ⅓ and turn the steering wheel at an angle of y degrees" can be derived. Therefore, as safety standards for community roads, for example, it is possible to derive, for example, the fact that the number of passengers is irrelevant.

Sixth Example Embodiment

A sixth example embodiment is another application example of the third or fourth example embodiment described above. The sixth example embodiment is applied to face data of a vending machine. The face data is, for example, information indicating the arrangement (positions and order of stages) and label contents of drink samples for sale in a drink vending machine. Here, it is known that the tendency in sales of vending machines is greatly influenced by the surrounding environment of the installed place, the customer segment, and the face data. Examples of the environmental information include the type and number of drinks handled by another vending machine installed next to a certain vending machine, and whether the vending machine belongs to the company a routeman works for or another company. Other examples of the environmental information include whether or not there is a convenience store in the neighborhood, if the installed location is in a residential area (where condominiums or detached houses are present) or a commercial district, and if the installed location is inside a building, the number of floors and the department of the office on that floor. On the other hand, in most cases, the pattern of face data employed by each vending machine is left to the discretion of the routeman (a person in charge of delivery and replenishment of drinks) in the field, based on his/her experience in consideration of the environmental information. Therefore, it is also known that the sales of vending machines depend on the proficiency of the routeman (depend on the kind of face data to use).

Figure 14:
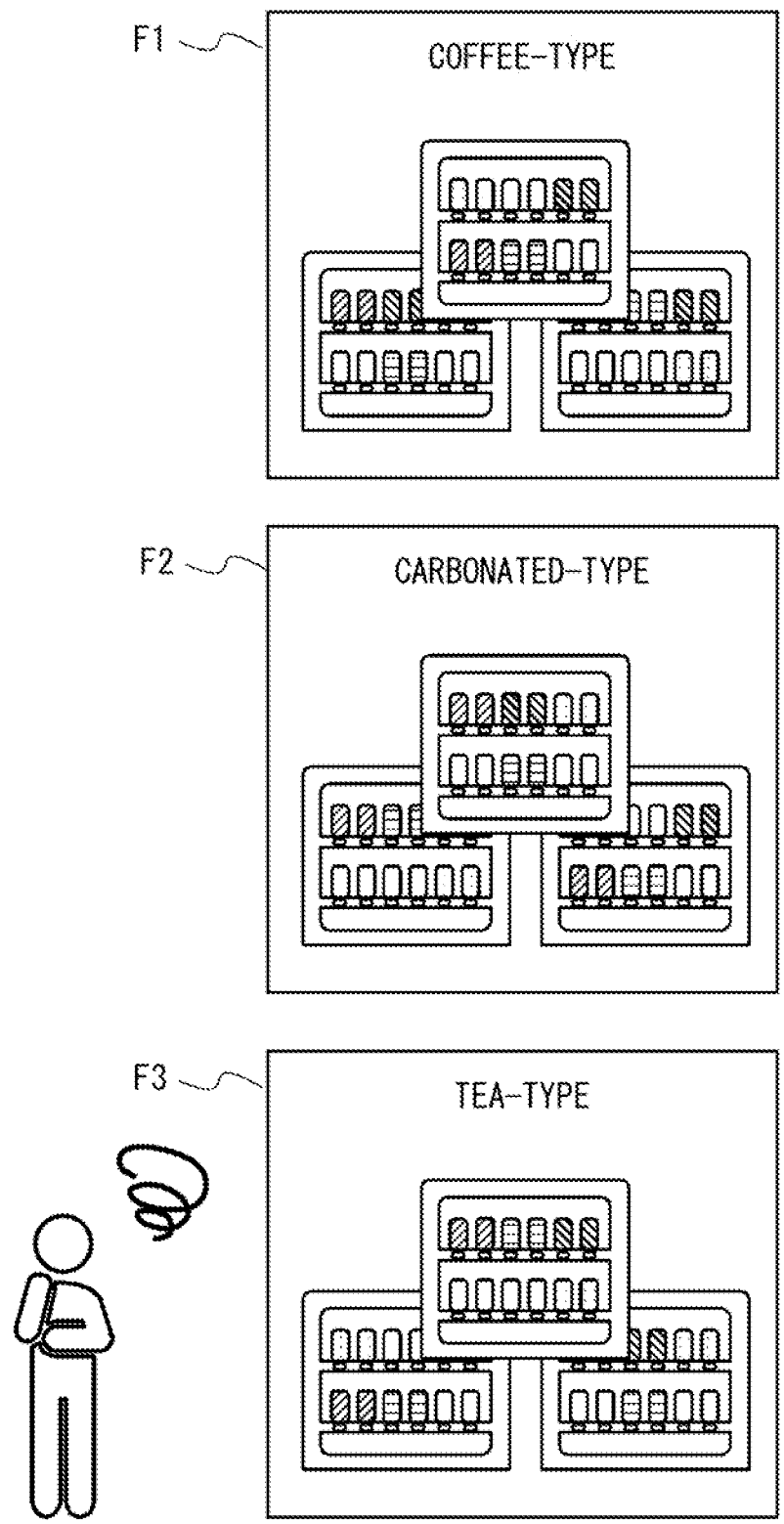
FIG. 14 is a diagram for explaining a concept of a face data group for each category of vending machines.

Here, the types of products (drinks, etc.) handled by the vending machines and their ratios (the number of drinks) are referred to a column organization, and are generally determined in advance by the distributor. The column organization may also be referred to as a category for a group of primary drinks handled. FIG. 14 is a diagram for explaining a concept of a face data group for each category of the vending machines. For example, a face data group F1 is a set of face data in a coffee-type category mainly selling coffee. A face data group F2 is a set of face data in a carbonated-type category mainly selling carbonated drinks. A face data group F3 is a set of face data in a tea-type category mainly selling tea.

Here, it can also be considered to obtain all (a large amount of) the face data and the environmental information of each vending machine, and to generate a model for deriving the face data for each environment by deep learning. However, most of the face data and the environmental information for each vending machine is not computerized at present. For this reason, it is difficult for the routeman to acquire the face data of all the vending machines, because it is a heavy burden on the routeman. On the other hand, in the sales information for each vending machine, the number of sold drinks or the amount of sales for each type of drink is accurately recorded for each predetermined period. The period is related to the timing of delivery and replenishment by the routeman, and is also clearly related to changes in the face data.

Therefore, it can be considered to regard the routeman in charge of the vending machine with large sales as the skilled person, to regard the face data employed by the skilled person as the "action", and to regard the pair of the "state" of the applied vending machine (the target environment) and the "action" as the expert data. Here, the state includes the above-mentioned environmental information, customer segment, sales information during the application period, and the application period of the face data. As described above, the burden of acquiring and computerizing the face data is relatively low, because the face data is limited to the face data employed by the skilled routeman.

Figure 15:
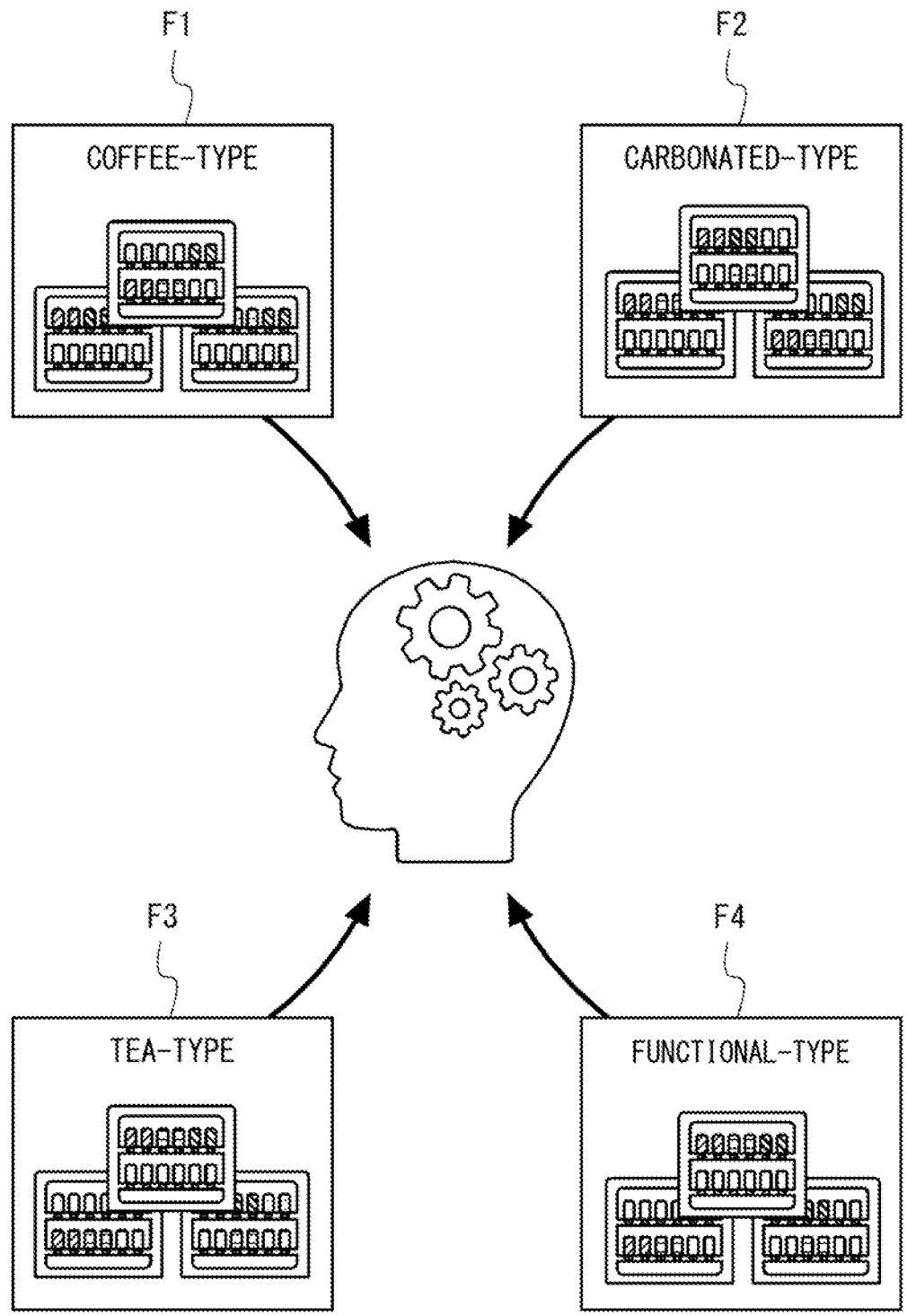
FIG. 15 is a diagram for explaining a concept of model generation of face data of a vending machine according to a sixth example embodiment.

FIG. 15 is a diagram for explaining a concept of generating a model of the face data of the vending machine according to the sixth example embodiment. Here, it is assumed that the face data groups F1, F2, F3, and F4 are employed by the experts and are computerized data. The face data group F4 is a set of the face data in a vending machine of a functional-type category. The face data groups F1 to F4 are, for example, photographed images of the front (sample and label of products for sale) of the vending machine, or the arrangement (position and order of stages) and the contents of the labels of the drink samples for sale converted into text. It is also assumed that the environmental information corresponding to the face data groups F1 to F4 is also obtained from the experts and then computerized (converted into text). By the sequential reward learning unit 310 performing sequential learning reward using these pieces of the face data and expert data such as the environmental information and the sales information, the adapted first model can be generated. Further, the model correction unit 320a or the like can correct the first model using the correction model to generate the second model. The adaptation unit 330a or the like can adapt the second model to a vending machine having a partially different condition to propose the optimum face data under the condition. For example, in a vending machine at a certain installed location, the face data of a category different from that of the face data before may be proposed.

Figure 16:
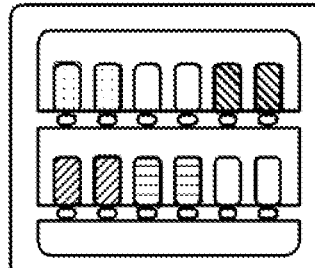
FIG. 16 is a diagram for explaining an example of face data proposed when a model is applied to a plurality of vending machines having conditions different from each other according to the sixth example embodiment.
Figure 16:
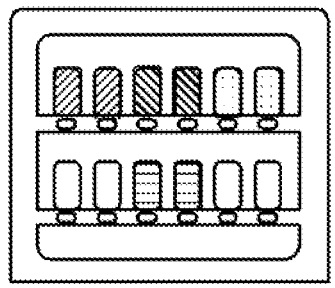
Figure 16:
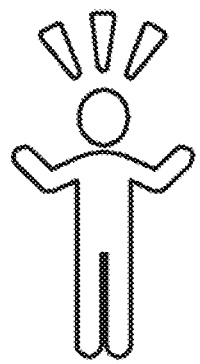
Figure 16:
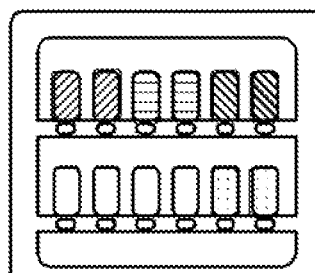

FIG. 16 is a diagram for explaining an example of face data proposed when a model is applied to a plurality of vending machines having conditions different from each other according to the sixth example embodiment. For example, face data F5 is an example of the face data optimum for the coffee-type category. Face data F6 is an example of the face data optimum for the carbonated-type category. Face data F7 is an example of the face data optimum for the tea-type category.

As described above, according to this example embodiment, the optimum face data can be proposed in accordance with the environmental information using the adapted model. It is also possible to propose (sell) an optimum set of the column organization and the face organization to the sales company based on the environmental information of the vending machine.

Seventh Example Embodiment

A seventh example embodiment is another application example of the third or fourth example embodiment described above. The seventh example embodiment is applied to a water supply infrastructure. The water supply infrastructure should be reviewed as the time passes and in response to changes in the environment. For example, it may be necessary to downsize the water supply infrastructure in light of the reduction in water demand due to the population decline and water conservation effects, as well as renewal costs associated with aging facilities and pipelines.

For example, in order to draw up a facility maintenance plan for the improvement of the efficiency of business management of the water supply infrastructure, it is necessary to optimize the facility capacity and consolidate and abolish the facilities, in consideration of the future decrease in water demand and the timing of facility renewal. Specifically, when the water demand is decreasing, it can be considered to downsize the water supply infrastructure to reduce the amount of water by replacing the pumps of the facility which supply water excessively. Other options include the absolution of distribution facilities themselves and the integration (sharing) of pipelines from other distribution facilities in other areas. This is because cost reduction and improvement of the efficiency can be expected by downsizing the water supply infrastructure in this manner.

A water supply infrastructure has much in common across regions (local governments). Thus, it can be said that models (and parameters) generated and adapted to the water supply infrastructure in a certain area can be effectively applied to the water supply infrastructure in other areas.

When the water supply infrastructure is considered as a system, the target environment, state, agent, and action are as follows. First, the target environment is represented as a set of states (e.g., a water distribution network, a pump capacity, a water distribution line condition, etc.) of the water supply infrastructure. The states are represented by variables that describe the dynamics of the network that cannot be explicitly operated by the operator, such as a voltage, a water level, a pressure, and a water volume at each location. The agent corresponds to the operator who takes actions based on the decision and an external system. The action to be taken by the agent is to supply water to the demanding area in the distribution network without excess or deficiency. Thus, actions are represented by variables that can be controlled based on operational rules, such as opening and closing valves, drawing in water, and pump thresholds.

FIG. 17 is a diagram for explaining a concept of applying the water supply model of the water supply infrastructure of the area according to the seventh example embodiment to other waterworks bureaus. A water supply infrastructure W1 is the water supply infrastructure of a waterworks bureau of a certain area. The operation of the water supply infrastructure W1 by the skilled staff and the state of the environment at that time can be referred to as the expert data. Therefore, by accumulating the expert data and the sequential reward learning unit 310 performing the sequential reward learning using the expert data, the adapted first model can be generated. Then, the model correction unit 320a or the like can correct the first model using the correction model to generate the second model.

It is assumed that water supply infrastructures W2 to W5 are conditions in areas different from that of the water supply infrastructure W1 or conditions to be downsized in the future. Thus, the adaptation unit 330a or the like can realize highly accurate control in various areas or conditions by adapting the second model to the water supply infrastructures W2 to W5.

Other Example Embodiments

Note that each of the example embodiments described above can be regarded as a kind of transfer learning.

In the above example embodiments, each element shown in the drawings as a functional block for performing various processes can be composed of a CPU (Central Processing Unit), a memory, or other circuits in terms of hardware, and can be implemented by a program or the like which is loaded into the memory and executed by the CPU in terms of software. It will thus be understood by those skilled in the art that these functional blocks may be implemented in a variety of ways, either hardware only, software only, or a combination thereof.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described example embodiments, and may be modified as appropriate without departing from the spirit of the disclosure. Further, the present disclosure may be implemented by appropriately combining the respective example embodiments.

The whole or part of the exemplary embodiments disclosed above can be described as, but not limited to, the following supplementary notes.

(Supplementary note 1)

An information processing apparatus comprising:
a generation unit configured to correct a first model adapted to a first system operated based on a first condition including a specific environment and a specific agent using a correction model to thereby generate a second model; and
an adaptation unit configured to adapt the second model to a second system operated based on a second condition, the second condition being partially different from the first condition.

(Supplementary note 2)

The information processing system according to Supplementary note 1, wherein
the adaptation unit is configured to acquire operation data aobtainedcquired by operating the second system using the second model, and the adaptation unit is configured to adapt the second model to the second system using the acquired operation data.

(Supplementary note 3)

The information processing apparatus according to claim 1 or 2, wherein
the generation unit is configured to correct an evaluation criterion for evaluating an action of the agent included in the first model using the correction model.

(Supplementary note 4)

The information processing apparatus according to Supplementary note 3, wherein the generation unit is configured to use a correction parameter for correcting a parameter of the evaluation criterion as the correction model to thereby generate the second model.

(Supplementary note 5)
The information processing apparatus according to Supplementary note 1 or 2, wherein
the generation unit is configured to calculate the correction model using the operation data in the second system, and
the generation unit is configured to correct the first model using the calculated correction model to thereby generate the second model.

(Supplementary note 6)
The information processing apparatus according to any one of Supplementary notes 1 to 5, wherein
the adaptation unit is configured to adapt the second model to a third system operated based on a third condition, the third condition being partially different from both the first condition and the second condition.

(Supplementary note 7)
The information processing apparatus according to any one of Supplementary notes 1 to 5, wherein
the generation unit is configured to correct the first model using the first correction model corresponding to the second condition to thereby generate the second model,
the generation unit is configured to correct the first model using a second correction model corresponding to a third condition to thereby generate a third model, the third condition being partially different from both the first condition and the second condition, and
the adaptation unit is configured to adapt the third model to a third system operated based on the third condition.

(Supplementary note 8)
The information processing apparatus according to any one of Supplementary notes 1 to 5, wherein
the generation unit is configured to correct a fourth model adapted to a fourth system operated based on a fourth condition using the correction model to thereby generate the corrected fourth model, the fourth condition being partially different from the first condition,
the adaptation unit is configured to adapt the fourth model to the fourth system operated based on the fourth condition, and
the information processing apparatus further comprises an output unit configured to output a comparison result between the second model and the fourth model adapted by the adaptation unit.

(Supplementary note 9)
The information processing apparatus according to any one of Supplementary notes 1 to 8, wherein
the first model includes a policy function and a reward function generated by sequential reward learning using action data in which a state vector and an action are associated with each other, the state vector indicating a state of the specific environment, and the action being taken by the specific agent in the state represented by the state vector,
the reward function outputs a reward obtained in the state represented by the state vector in response to an input of the state vector, and
the policy function inputs an output value of the reward function when the state vector is input, and outputs the action to be taken by the specific agent in the state represented by the state vector.

(Supplementary note 10)
The information processing apparatus according to Supplementary note 9, wherein
the first model includes a physical equation associated with the reward function and a state transition probability associated with the policy function, the state transition probability following a Boltzmann distribution representing a probability distribution of the state that is predetermined.

(Supplementary note 11)
An information processing system comprising:
a storage unit configured to store a first model adapted to a first system operated based on a first condition including a specific environment and a specific agent and a predetermined correction model;
a generation unit configured to generate a second model by correcting the first model using the correction model; and
an adaptation unit configured to adapt the second model to a second system operated based on a second condition, the second condition being partially different from the first condition.

(Supplementary note 12)
The information processing system according to Supplementary note 11, wherein
the adaptation unit is configured to acquire operation data obtained by operating the second system using the second model, and
the adaptation unit is configured to adapt the second model to the second system using the acquired operation data.

(Supplementary note 13)
A model adaptation method performed by a computer comprising:
correcting a first model adapted to a first system operated based on a first condition including a specific environment and a specific agent using a correction model to thereby generate a second model; and
adapting the second model to a second system operated based on a second condition, the second condition being partially different from the first condition.

(Supplementary note 14)
A non-transitory computer readable medium storing a model adaptation program for causing a computer to execute:
a process of correcting a first model adapted to a first system operated based on a first condition including a specific environment and a specific agent using a correction model to thereby generate a second model; and
a process of adapting the second model to a second system operated based on a second condition, the second condition being partially different from the first condition.

REFERENCE SIGNS LIST

1 INFORMATION PROCESSING APPARATUS
11 GENERATION UNIT
12 ADAPTATION UNIT
1000 INFORMATION PROCESSING SYSTEM
1000a INFORMATION PROCESSING SYSTEM
1000b INFORMATION PROCESSING SYSTEM
100 SYSTEM A
101 TARGET ENVIRONMENT
102 AGENT
103 ACTION
104 STATE
105 REWARD FUNCTION
110 EXPERT DATA SET
200 SYSTEM B
210 OPERATION DATA SET
200a SYSTEM C

210a OPERATION DATA SET
200b SYSTEM D
210b OPERATION DATA SET
300 INFORMATION PROCESSING APPARATUS
300a INFORMATION PROCESSING APPARATUS
300b INFORMATION PROCESSING APPARATUS
301 CPU
302 MEMORY
303 IF UNIT
304 STORAGE DEVICE
310 SEQUENTIAL REWARD LEARNING UNIT
320 MODEL CORRECTION UNIT
320a MODEL CORRECTION UNIT
330 ADAPTATION UNIT
330a ADAPTATION UNIT
340 STORAGE UNIT
341 CONDITION A
342 MODEL A
343 CORRECTION MODEL
343a CORRECTION MODEL
344 CONDITION B
345 MODEL B
344a CONDITION C
345a MODEL C
344b CONDITION D
345b MODEL D
346 MODEL ADAPTATION PROGRAM
350 COMPARISON AND OUTPUT UNIT
C11 DRIVING VEHICLE
C12 DRIVING VEHICLE
C21 DRIVING VEHICLE
C22 DRIVING VEHICLE
C23 DRIVING VEHICLE
C24 DRIVING VEHICLE
C31 DRIVING VEHICLE
C32 DRIVING VEHICLE
V11 VEHICLE
V12 VEHICLE
V13 VEHICLE
V21 VEHICLE
V22 VEHICLE
V23 VEHICLE
V24 VEHICLE
V25 VEHICLE
V26 VEHICLE
V27 VEHICLE
V28 VEHICLE
V31 VEHICLE
V32 VEHICLE
V33 VEHICLE
h1-1 CASE
h1-2 CASE
h2-1 CASE
h2-2 CASE
h2-3 CASE
h2-4 CASE
h3-1 CASE
h3-2 CASE
F1 FACE DATA GROUP
F2 FACE DATA GROUP
F3 FACE DATA GROUP
F4 FACE DATA GROUP
F5 FACE DATA
F6 FACE DATA
F7 FACE DATA
W1 WATER SUPPLY INFRASTRUCTURE
W2 WATER SUPPLY INFRASTRUCTURE
W3 WATER SUPPLY INFRASTRUCTURE
W4 WATER SUPPLY INFRASTRUCTURE
W5 WATER SUPPLY INFRASTRUCTURE

What is claimed is:

1. An information processing apparatus comprising:
at least one memory storing instructions; and
at least one processor configured to execute the instructions to:
correct, using a correction model, a first model to generate a second model, the first model adapted to a first system that is operated based on a first condition including a specific environment and a specific agent; and
adapt the second model to a second system that is operated based on a second condition, the second condition being partially different from the first condition, wherein
the first model includes a policy function and a reward function generated by sequential reward learning using action data in which a state vector and an action are associated with each other, the state vector indicating a state of the specific environment, and the action being taken by the specific agent in the state represented by the state vector,
the reward function outputs a reward obtained in the state represented by the state vector in response to an input of the state vector, and
the policy function inputs an output value of the reward function when the state vector is input, and outputs the action to be taken by the specific agent in the state represented by the state vector.

2. The information processing apparatus according to claim 1, wherein the at least one processor further configured to execute the instructions to
acquire operation data obtained by operating the second system using the second model, and
adapt the second model to the second system using the acquired operation data.

3. The information processing apparatus according to claim 1, wherein the at least one processor further configured to execute the instructions to
correct an evaluation criterion for evaluating an action of the agent included in the first model using the correction model.

4. The information processing apparatus according to claim 3, wherein the at least one processor further configured to execute the instructions to
use a correction parameter for correcting a parameter of the evaluation criterion as the correction model to thereby generate the second model.

5. The information processing apparatus according to claim 1, wherein the at least one processor further configured to execute the instructions to
calculate the correction model using the operation data in the second system, and
correct the first model using the calculated correction model to generate the second model.

6. The information processing apparatus according to claim 1, wherein the at least one processor further configured to execute the instructions to
adapt the second model to a third system that is operated based on a third condition, the third condition being partially different from both the first condition and the second condition.

7. The information processing apparatus according to claim 1, wherein the at least one processor further configured to execute the instructions to correct the first model using the first correction model corresponding to the second condition to generate the second model, correct the first model using a second correction model corresponding to a third condition to generate a third model, the third condition being partially different from both the first condition and the second condition, and adapt the third model to a third system that is operated based on the third condition.

8. The information processing apparatus according to claim 1, wherein the at least one processor further configured to execute the instructions to correct a fourth model adapted to a fourth system that is operated based on a fourth condition using the correction model to generate the corrected fourth model, the fourth condition being partially different from the first condition, adapt the fourth model to the fourth system that is operated based on the fourth condition, and output a comparison result between the second model and the fourth model as has been adapted.

9. The information processing apparatus according to claim 1, wherein the first model includes a physical equation associated with the reward function and a state transition probability associated with the policy function, the state transition probability following a Boltzmann distribution representing a probability distribution of the state that is predetermined.

10. A model adaptation method performed by a computer and comprising:

correcting, using a correction model, a first model to generate a second model, the first model adapted to a first system that is operated based on a first condition including a specific environment and a specific agent; and adapting the second model to a second system that is operated based on a second condition, the second condition being partially different from the first condition, wherein the first model includes a policy function and a reward function generated by sequential reward learning using action data in which a state vector and an action are associated with each other, the state vector indicating a state of the specific environment, and the action being taken by the specific agent in the state represented by the state vector, the reward function outputs a reward obtained in the state represented by the state vector in response to an input of the state vector, and the policy function inputs an output value of the reward function when the state vector is input, and outputs the action to be taken by the specific agent in the state represented by the state vector.

11. A non-transitory computer readable medium storing a model adaptation program for causing a computer to execute:

a process of correcting, using a correction model, a first model to generate a second model, the first model adapted to a first system that is operated based on a first condition including a specific environment and a specific agent; and a process of adapting the second model to a second system that is operated based on a second condition, the second condition being partially different from the first condition, wherein the first model includes a policy function and a reward function generated by sequential reward learning using action data in which a state vector and an action are associated with each other, the state vector indicating a state of the specific environment, and the action being taken by the specific agent in the state represented by the state vector, the reward function outputs a reward obtained in the state represented by the state vector in response to an input of the state vector, and the policy function inputs an output value of the reward function when the state vector is input, and outputs the action to be taken by the specific agent in the state represented by the state vector.

* * * * *